United States Patent
Nomura et al.

(10) Patent No.: US 10,890,355 B2
(45) Date of Patent: Jan. 12, 2021

(54) HEAT PUMP APPARATUS

(71) Applicant: Mitsubishi Electric Corporation, Chiyoda-ku (JP)

(72) Inventors: Yasumitsu Nomura, Chiyoda-ku (JP); Shigetoshi Ipposhi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/486,874

(22) PCT Filed: Nov. 22, 2017

(86) PCT No.: PCT/JP2017/041983
§ 371 (c)(1),
(2) Date: Aug. 19, 2019

(87) PCT Pub. No.: WO2018/193658
PCT Pub. Date: Oct. 25, 2018

(65) Prior Publication Data
US 2020/0011569 A1 Jan. 9, 2020

(30) Foreign Application Priority Data
Apr. 19, 2017 (JP) .................................. 2017-082928

(51) Int. Cl.
*F24H 4/02* (2006.01)
*F24H 7/02* (2006.01)
(Continued)

(52) U.S. Cl.
CPC ................. *F24H 4/02* (2013.01); *F24H 7/02* (2013.01); *F24H 9/2007* (2013.01); *F25B 6/04* (2013.01);
(Continued)

(58) Field of Classification Search
CPC . F24H 4/02; F24H 7/20; F24H 9/2007; F24H 4/04; F24H 7/0233; F25B 6/04;
(Continued)

(56) References Cited

U.S. PATENT DOCUMENTS 2,575,325 A * 11/1951 Ambrose ................ F25B 30/02
62/181
4,155,506 A * 5/1979 Brosenius ........... F24D 19/1009
126/362.1
(Continued)

FOREIGN PATENT DOCUMENTS

CN 103090591 A 5/2013
JP 61-225539 A 10/1986
(Continued)

OTHER PUBLICATIONS

Extended European Search Report dated Apr. 28, 2020 in corresponding European Patent Application No. 17906167.6, 8 pages.

*Primary Examiner* — Daniel E. Namay
(74) *Attorney, Agent, or Firm* — Xsensus LLP

(57) ABSTRACT

A heat pump apparatus includes a use-side heat exchanger that causes heat exchange to be performed between a heat medium flowing from a heat-storage heat exchanger and a heat usage medium, and a flow-passage switching device that switches a flow passage for the heat medium to a first flow passage that circulates through a heat-reception-side heat exchanger and the heat-storage heat exchanger without extends through the use-side heat exchanger or a second flow passage that circulates through the heat-reception-side heat exchanger and the heat-storage heat exchanger via the use-side heat exchanger. Even when the temperature of the heat storage medium rises, heat received from a heat source can be stored in the heat storage medium by a heat pump, while a decrease of the efficiency of the heat pump can be reduced.

8 Claims, 8 Drawing Sheets

(51) Int. Cl.
*F24H 9/20* (2006.01)
*F25B 6/04* (2006.01)
*F25B 30/02* (2006.01)
*F25B 41/04* (2006.01)
*F28D 20/02* (2006.01)

(52) U.S. Cl.
CPC .............. *F25B 30/02* (2013.01); *F25B 41/04* (2013.01); *F28D 20/021* (2013.01)

(58) Field of Classification Search
CPC ........ F25B 41/04; F24B 30/02; F28D 20/021; F24D 3/02; F24D 3/08; F24D 3/082; F24D 11/005; F24D 19/1012; F24D 19/1024; F24D 19/1072; F24D 19/1054; F24D 2220/10
USPC ........................................................ 237/2 B
See application file for complete search history.

(56) References Cited

U.S. PATENT DOCUMENTS

| | | | | |
|---|---|---|---|---|
| 4,163,369 A * | 8/1979 | Owen | .................... | F25B 30/02 237/2 B |
| 4,175,698 A * | 11/1979 | Brosenius | ........... | F24D 19/1009 237/19 |
| 4,226,606 A * | 10/1980 | Yaeger | .................... | F24D 17/02 62/238.6 |
| 4,321,797 A * | 3/1982 | Yaeger | .................... | F24D 17/02 62/238.6 |
| 4,363,221 A * | 12/1982 | Singh | .................... | F24D 17/02 62/238.6 |
| 5,020,721 A * | 6/1991 | Horne | .................... | F24D 17/00 122/14.3 |
| 5,772,113 A * | 6/1998 | Gerstmann | ............... | F24H 4/04 237/8 R |
| 5,918,805 A * | 7/1999 | Guyer | .................... | F01K 17/02 237/2 A |
| 5,996,362 A * | 12/1999 | Likitcheva | ................ | F24H 4/02 62/174 |
| 6,837,443 B2 * | 1/2005 | Saitoh | .................... | F24D 17/02 237/2 B |
| 8,850,837 B2 * | 10/2014 | Park | ......................... | F25B 7/00 62/160 |
| 9,677,809 B1 * | 6/2017 | Eustis | .................... | F25B 49/02 |
| 10,323,870 B2 * | 6/2019 | Douglas | ................ | F25B 49/02 |
| 10,345,004 B1 * | 7/2019 | Hern | ...................... | F24D 15/04 |
| 10,535,245 B2 * | 1/2020 | Callemo | ................ | F24D 3/082 |
| 2003/0178498 A1 * | 9/2003 | Saitoh | .................... | F24D 17/02 237/2 B |
| 2008/0017724 A1 * | 1/2008 | Threatt | .................... | F24H 1/18 237/19 |
| 2011/0283725 A1 * | 11/2011 | Sim | .................... | F24D 11/0214 62/151 |
| 2012/0102991 A1 * | 5/2012 | Lee | ......................... | F25B 7/00 62/160 |
| 2014/0109611 A1 * | 4/2014 | Uchino | .................. | F25B 49/005 62/324.6 |
| 2014/0116072 A1 * | 5/2014 | Kim | ......................... | F24D 3/18 62/79 |
| 2015/0267923 A1 * | 9/2015 | Fan | ......................... | F24D 3/08 62/235.1 |
| 2016/0195311 A1 * | 7/2016 | Li | .............................. | F24H 4/04 62/115 |
| 2017/0000544 A1 * | 1/2017 | Mahrouche | ............... | F25B 5/00 |
| 2017/0010052 A1 * | 1/2017 | Lenk | .................... | F25B 30/02 |
| 2017/0030594 A1 * | 2/2017 | Robinson | ............... | F24D 17/02 |
| 2017/0248349 A1 * | 8/2017 | Kujak | .................... | F25B 9/10 |
| 2017/0292743 A1 * | 10/2017 | Douglas | ................ | F25B 49/02 |
| 2018/0010822 A1 * | 1/2018 | Trant | .................... | F25B 30/02 |
| 2018/0106483 A1 * | 4/2018 | Zhang | ........................ | F24H 4/04 |
| 2018/0328598 A1 * | 11/2018 | Callemo | ................ | F24D 3/18 |
| 2018/0335219 A1 * | 11/2018 | Callemo | ................ | F24F 5/0046 |
| 2018/0336775 A1 * | 11/2018 | Callemo | ................ | F25B 30/02 |
| 2019/0264927 A1 * | 8/2019 | Suzuki | ................ | F24D 11/0228 |
| 2020/0191435 A1 * | 6/2020 | Kikugawa | ................ | F24F 11/74 |

FOREIGN PATENT DOCUMENTS

| | | |
|---|---|---|
| JP | 7-229689 A | 8/1995 |
| JP | 2007-192540 | 8/2007 |
| JP | 2011-85264 A | 4/2011 |
| JP | 2013-185741 | 9/2013 |
| WO | WO 2016/046882 A1 | 3/2016 |

* cited by examiner

HEAT PUMP APPARATUS

CROSS-REFERENCE TO RELATED APPLICATIONS

This application is a United States national stage application of International Application No. PCT/JP2017/041983, filed Nov. 22, 2017, which designates the United States, and claims priority to Japanese Patent Application No. 2017-082928, filed Apr. 19, 2017, and the entire contents of each of the above applications are hereby incorporated herein by reference in entirety.

TECHNICAL FIELD

The present invention relates to a heat pump apparatus in which heat is stored in a heat storage medium by a heat pump.

BACKGROUND ART

In a well-known existing heat pump apparatus, heat removed from outside air by a heat pump using a refrigeration cycle is applied to both heating of hot water in a heat storage tank and reheating of hot water in a bathtub (see, for example, Patent Literature 1).

The existing heat pump apparatus includes: a heat-reception-side heat exchanger that causes heat exchange to be performed between outside air corresponding to a heat source and a heat medium flowing in a heat pump circuit, and heats the heat medium with heat received from the outside air; a heat-storage heat exchanger that causes heat exchange to be performed between the heat medium and water corresponding to a heat storage medium in the heat storage tank, a use-side heat exchanger that causes heat exchange to be performed between the heat medium and water put in the bathtub; a compressor that compresses the heat medium into a high-temperature and high-pressure heat medium; a pressure reducing device that is a capillary tube, and expands by throttling the high-pressure heat medium to reduce the pressure thereof to a low pressure; and a plurality of flow-passage switching devices that are three-way valves and change a flow passage for the heat medium flowing through the heat pump circuit in a switching manner.

When the heat pump apparatus heats water in the heat storage tank and stores heat, the plurality of flow-passage switching devices are caused to switch the flow passage for the heat medium in the heat pump circuit to a flow passage in which the compressor, the heat-storage heat exchanger, the pressure reducing device, and the heat-reception-side heat exchanger are connected in series in this order, and the use-side heat exchanger is disconnected from the flow passage for the heat medium. Furthermore, when the heat pump apparatus reheats hot water in the bathtub, the plurality of flow-passage switching devices are caused to switch the flow passage for the heat medium in the heat pump circuit such that the compressor, the use-side heat exchanger, the pressure reducing device, and the heat-storage heat exchanger are serially connected in this order, and the heat-reception-side heat exchanger is disconnected from the flow passage for the heat medium. Alternatively, the plurality of flow-passage switching devices switch the flow passage for the heat medium in the heat pump circuit to a flow passage in which the compressor, the use-side heat exchanger, the pressure reducing device, and the heat-reception-side heat exchanger are serially connected in this order, and the heat-storage heat exchanger is disconnected from the flow passage for the heat medium. In such a manner, in the existing heat pump apparatus, the plurality of flow-passage switching devices are caused to switch the flow passage for the heat medium, whereby the hot water in the bathtub is reheated by a heat pump that uses hot water in the heat storage tank or outside air as a heat source.

CITATION LIST

Patent Literature

Patent Literature 1: Japanese Unexamined Patent Application Publication No. 61-225539

SUMMARY OF INVENTION

Technical Problem

However, in the existing heat pump apparatus described in Patent Literature 1, when water corresponding to the heat storage medium in the heat storage tank is heated by the heat pump and heat is stored, the amount of heat transferred to the heat storage medium from the heat medium circulating in the heat pump circuit decreases as the temperature of the heat storage medium increases. Thus, the temperature of the heat medium which returns to the compressor is higher than in the case where heat is sufficiently transferred from the heat medium. Thus, the efficiency of the heat pump is decreased.

The present invention has been made to solve the above problem, and an object of the invention is to provide a heat pump apparatus in which even in the case where the temperature of a heat storage medium rises to a high value, it is possible to store in the heat storage medium, heat received from a heat source, while reducing a decrease in the efficiency of the heat pump.

Solution to Problem

A heat pump apparatus according to an embodiment of the present invention includes: a pressure reducing device configured to expand a heat medium flowing into the pressure reducing device to reduce a pressure of the heat medium, and then allow the heat medium to flow from the pressure reducing device; a heat-reception-side heat exchanger into which the heat medium flowing from the pressure reducing device flows, the heat-reception-side heat exchanger being configured to cause heat exchange to be performed between the heat medium and a heat source; a compressor configured to suck the heat medium flowing from the heat-reception-side heat exchanger, compress the heat medium to increase a pressure of the heat medium, and discharge the heat medium; a heat-storage heat exchanger into which the heat medium discharged from the compressor flows, the heat-storage heat exchanger being configured to cause heat exchange to be performed between the heat medium and a heat storage medium; a use-side heat exchanger into which the heat medium flows from the heat-storage heat exchanger, the user-side heat exchanger being configured to cause exchange heat to be performed between the heat medium and a heat usage medium, and then allow the heat medium to flow from the use-side heat exchanger to the pressure reducing device; and a flow-passage switching device configured to switch a flow passage for the heat medium discharged from the heat-storage heat exchanger to a first flow passage or a second flow passage, the first flow passage extending through the pressure reducing device, the heatreception-side heat exchanger, the compressor and the heat-storage heat exchanger without extending through the use-side heat exchanger, the second flow passage extending through the pressure reducing device, the heat-reception-side heat exchanger, the compressor and the heat-storage heat exchanger via the use-side heat exchanger.

Advantageous Effects of Invention

According to the heat pump apparatus according to the embodiment of the present invention, since the flow-passage switching device switches the flow passage for the heat medium between the first flow passage and the second flow passage, even in the case where the temperature of the heat storage medium rises to a high value, it is possible to store in the heat storage medium, heat received from the heat source using a heat pump, while reducing a decrease in the efficiency of the heat pump.

DESCRIPTION OF EMBODIMENTS

Embodiment 1

Figure 1:
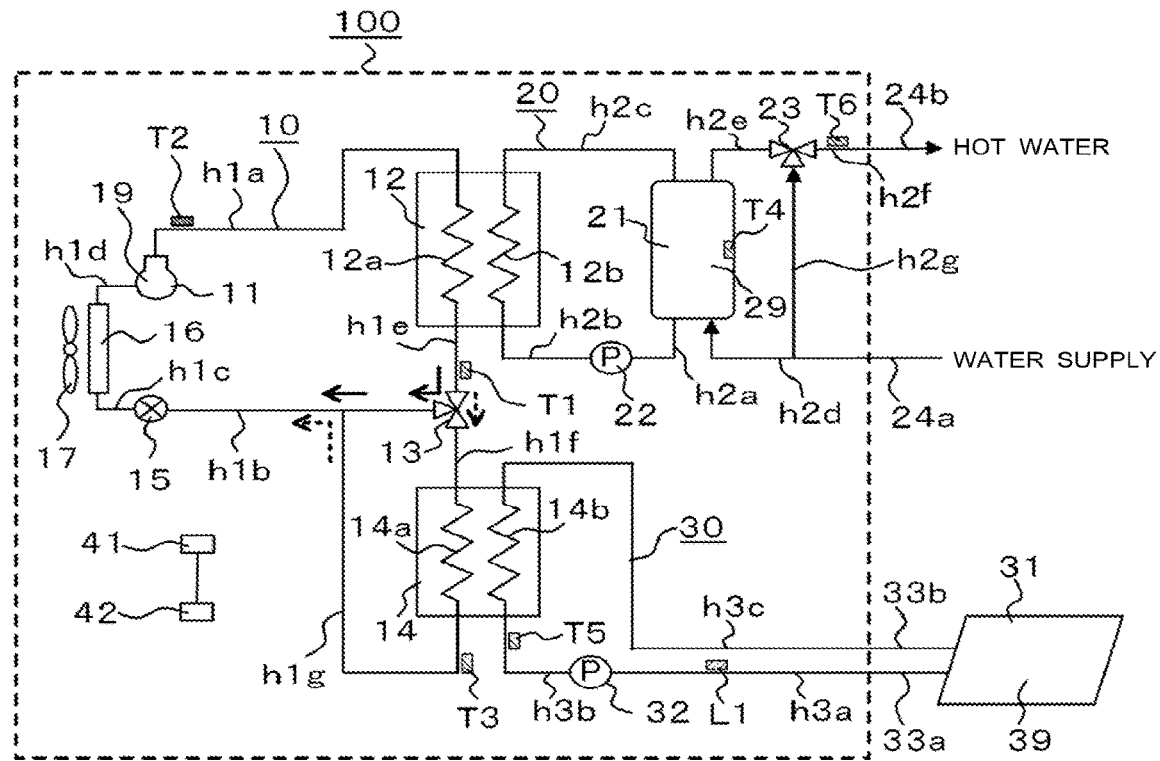
FIG. 1 is a schematic view illustrating a configuration of a heat pump apparatus according to embodiment 1 of the present invention.

A configuration of a heat pump apparatus according to embodiment 1 of the present invention will be described. FIG. 1 is a schematic view of the configuration of the heat pump apparatus according to embodiment 1 of the present invention.

As illustrated in FIG. 1, a heat pump apparatus 100 includes a heat pump circuit 10, a heat storage circuit 20, and a heat usage circuit 30. The heat pump circuit 10 includes a compressor 11, a heat-storage heat exchanger 12, a use-side heat exchanger 14, a pressure reducing device 15, and a heat-reception-side heat exchanger 16. The heat pump circuit 10 causes heat received by the heat-reception-side heat exchanger 16 to be transmitted to the heat-storage heat exchanger 12 and the use-side heat exchanger 14, with a refrigeration cycle using a heat medium 19 enclosed in the heat pump circuit 10. The use-side heat exchanger 14 is provided downstream of the heat-storage heat exchanger 12 in the flow direction of the heat medium 19.

The heat storage circuit 20 includes a heat storage tank 21 connected to the heat-storage heat exchanger 12 of the heat pump apparatus 10 and a circulation pump 22 that causes a heat storage medium 29 to circulate in the heat storage circuit 20. In the heat-storage heat exchanger 12, when heat exchange is performed between the heat medium 19 of the heat pump circuit 10 and the heat storage medium 29, heat received in the heat-reception-side heat exchanger 16 of the heat pump circuit 10 is stored in the heat storage medium 29 in the heat storage tank 21. The heat usage circuit 30 includes a heat usage terminal 31 connected to the use-side heat exchanger 14 of the heat pump apparatus 10 and a circulation pump 32 that causes a heat usage medium 39, which is applied to the heat usage terminal 31, to circulate in the heat usage circuit 30. In the use-side heat exchanger 14, when heat exchange is performed between the heat medium 19 of the heat pump apparatus 10 and the heat usage medium 39, the heat usage medium 39 is heated by heat received in the heat-reception-side heat exchanger 16 of the heat pump circuit 10. The maximum temperature of the heat storage medium 29 is higher than the maximum temperature of the heat usage medium 39, and the heat stored in the heat storage medium 29 is applied to a given application that requires a temperature which is higher than that of the heat usage medium 39.

Embodiment 1 will be described by referring to the case where heat stored in the heat storage tank 21 is used in hot-water supply and the heat usage terminal 31 is a bath. To be more specific, the heat storage medium 29 stored in the heat storage tank 21 is water, and the heat usage medium 39 stored in a bathtub of the bath corresponding to the heat usage terminal 31 is also water. Hot water heated and stored in the heat storage tank 21 is supplied not only to a kitchen, a lavatory, a shower, or the like, but to the bathtub of the bath corresponding to the heat usage terminal 31 in order for the bathtub to be filled with the hot water. That is, when hot water is supplied into the bathtub of the bath corresponding to the heat usage terminal 31, the hot water serves as the heat usage medium 39. The heat usage medium 39 supplied into the bathtub is not limited to hot water. Water into which hot water cools off to change or water supplied from a tap may be used as the heat usage medium 39. The heat usage circuit 30 is used to reheat the heat usage medium 39 or keep the temperature of the heat usage medium 39 hot as heat-retention, the heat usage medium 39 being hot water supplied in the bathtub of the bath corresponding to the heat usage terminal 31.

The configuration of the heat pump apparatus 100 according to embodiment 1 of the present invention will be described.

As illustrated in FIG. 1, the heat pump circuit 10 of the heat pump apparatus 100 includes the pressure reducing device 15, the heat-reception-side heat exchanger 16, the compressor 11, the heat-storage heat exchanger 12, the use-side heat exchanger 14, and the flow-passage switching device 13, which are connected by pipes h1a to h1g. In the heat pump circuit 10, the heat medium 19 is enclosed therein, and is circulated in the pressure reducing device 15, the heat-reception-side heat exchanger 16, the compressor 11, the heat-storage heat exchanger 12, the use heat exchanger 14, and the flow-passage switching device 13 through the pipes h1a to h1g. The heat medium 19 may be a natural refrigerant such as carbon dioxide or propane, or refrigerant for use in a refrigeration cycle, for example, a hydrofluorocarbon refrigerant such as R410 or R32. Therefore, the heat pump circuit 10 may be referred to as a refrigeration cycle circuit, and the heat medium 19 may be referred to as refrigerant. Furthermore, the heat pump apparatus 100 includes a controller 41 that controls the compressor 11, the pressure reducing device 15, a fan 17 and a flow-passage switching device 13 in the heat pump circuit 10. It should be noted that as occasion arises, the heat pump circuit 10 may include, in addition to the above components, for example, an accumulator that prevents a liquid from flowing back to the compressor 11.

The pressure reducing device 15 expands by throttling the heat medium 19 having flowed into the pressure reducing device 15 to reduce the pressure of the heat medium 19, and the heat medium 19 then flows from the pressure reducing device 15 toward the heat-reception-side heat exchanger 16. The pressure reducing device 15 may be, for example, an electronic expansion valve or a capillary tube. Preferably, an electronic expansion valve should be used as the pressure reducing device 15, because the state of the heat medium 19 can be more finely controlled by controlling the opening degree of the electronic expansion valve. The pressure reducing device 15 is controlled by the controller 41. In the case where the pressure reducing device 15 is an electronic expansion valve, the controller 41 controls the opening degree of the electronic expansion valve.

The heat-reception-side heat exchanger 16 is a heat exchanger which is connected to the pressure reducing device 15 by the pipe h1c, into which the heat medium 19 existing from the pressure reducing device 15 flows, and in which heat exchange is performed between the heat medium 19 and an external heat source. The external heat source may be air or groundwater. The embodiment of the present invention will be described on the assumption that the heat source is air. The heat-reception-side heat exchanger 16 may be, for example, a fin-tube heat exchanger made up of a metal pipe allowing the heat medium 19 to flow therethrough and a plurality of metal fins which are stacked at intervals such that air flows through space between the fins as the heat source. The fan 17, which is driven by an electric motor such as a DC motor, is provided to face the heat-reception-side heat exchanger 16. When the air corresponding to the heat source is supplied into the heat-reception-side heat exchanger 16 by the fan 17, heat is exchanged between the air flowing through the heat-reception-side heat exchanger 16 and the heat medium 19 flowing in the heat-reception-side heat exchanger 16. Since the temperature of the heat medium 19 in the heat-reception-side heat exchanger 16 is controlled lower than that of air, the heat medium 19 receives heat from the air corresponding to the heat source.

The compressor 11 is connected to the heat-reception-side heat exchanger 16 by the pipe h1d. In the case where the accumulator is used to prevent a liquid from flowing back to the compressor 11, it suffices that the accumulator is inserted in the pipe h1d between the compressor 11 and the heat-reception-side heat exchanger 16. That is, in the case where the accumulator is used, it may be considered as part of the pipe h1d. The same is true of the case where other components are inserted in the pipes h1a to h1g of the heat pump circuit 10. That is, in this case, the other components may be considered as part of the pipes. The compressor 11 sucks the heat medium 19 being in a low-pressure state, which flows out of the heat-reception-side heat exchanger 16, compresses the heat medium 19 to raise the pressure of the heat medium 19 to a higher pressure, and discharges the heat medium 19 as a high-temperature and high-pressure heat medium 19. The compressor 11 includes an electric motor whose rotation speed can be controlled and an inverter which drives the electric motor, and the capacity of the compressor 11 can be controlled. The rotation speed of the compressor 11 is controlled in response to a control signal input from the controller 41 to the inverter.

The heat-storage heat exchanger 12 is a heat exchanger which is connected to a discharge side of the compressor 11 by the pipe h1a, into which the heat medium 19 discharged from the compressor flows, and which causes heat exchange to be performed between the heat medium 19 and water corresponding to the heat storage medium 29 of the heat storage circuit 20. The heat-reception-side heat exchanger 12 has a heat medium flow passage 12a in which the heat medium 19 of the heat pump 10 flows and a heat storage medium flow passage 12b in which the heat storage medium 29 of the heat storage circuit 20 flows. The heat medium flow passage 12a and the heat storage medium flow passage 12b are isolated from each other by an element having a high thermal conductivity, such as metal. The high-temperature and high-pressure gas-phase heat medium 19 discharged from the compressor 11 and having flowed into the heat medium flow passage 12a of the heat-reception-side heat exchanger 12 is higher in temperature than the heat storage medium 29 which flows into the heat storage medium flow passage 12b of the heat-reception-side heat exchanger 12. The heat storage medium 29 is heated by heat transferred from the heat medium 19 having flowed into the heat-storage heat exchanger 12.

It is preferable that the heat-reception-side heat exchanger 12 be capable of causing heat exchange to be more efficiently performed even if the difference in temperature between the heat medium 19 flowing in the heat pump circuit 10 and the water corresponding to the heat storage medium 29 flowing in the heat storage circuit 20 is small. For example, the heat-reception-side heat exchanger 12 may be configured such that a heat medium pipe forming the heat medium flow passage 12a through which the heat medium 19 flows is wound around and brazed to a water pipe forming the heat storage medium flow passage 12b through which the water corresponding to the heat storage medium 29 flows. Alternatively, the heat-reception-side heat exchanger 12 may be configured such that a plurality of heat medium pipes are wound in parallel around a groove formed by twisting a water pipe. Alternatively, the heat-reception-side heat exchanger 12 may be a plate heat exchanger. It is preferable that the heat medium flow passage 12a and heat storage medium flow passage 12b of the heat-reception-side heat exchanger 12 be arranged such that the heat medium 19 and the heat storage medium 29 flow in opposite directions as countercurrent.

The use-side heat exchanger 14 is a heat exchanger which is connected to the heat-reception-side heat exchanger 12 by the pipes h1e and h1f via the flow-passage switching device 13, into which the heat medium 19 flowing out of the heat-reception-side heat exchanger 12 flows and which causes heat exchange to be performed between the heat medium 19 and water corresponding to the heat usage medium 39 of the heat usage circuit 30. The use-side heat exchanger 14 has a heat medium flow passage 14a through which the heat medium 19 of the heat pump circuit 10 flows and a heat-use-medium flow passage 14b through which the heat usage medium 39 of the heat usage circuit 30 flows. The heat medium flow passage 14a and the heat-use-medium flow passage 14b are isolated from each other by an element having a high thermal conductivity, such as metal. The use-side heat exchanger 14 may be a heat exchanger which has the same configuration as or a similar configuration to that of the heat-storage heat exchanger 12. The heat medium 19 having flowed into the use-side heat exchanger 14 transfers heat in the heat-storage heat exchanger 12, but is higher in temperature than the heat usage medium 39 which flows into the heat-use-medium flow passage 14b. The heat usage medium 39 is heated by the heat transferred by the heat medium 19 having flowed into the use-side heat exchanger 14. The use-side heat exchanger 14 is connected to the pressure reducing device 15 by the pipes h1g and h1b, and the heat medium 19 flowing from the use-side heat exchanger 14 re-flows into the pressure reducing device 15.

The flow-passage switching device 13 is provided between the heat-storage heat exchanger 12 and the use-side heat exchanger 14, connected to the heat-storage heat exchanger 12 by the pipe h1e, and connected to the use-side heat exchanger 14 by the pipe h1f. Furthermore, the flow-passage switching device 13 is connected to the pressure reducing device 15 by the pipe h1b. The pipe h1g, which is connected to a downstream side of the use-side heat exchanger 14, is connected to part of the pipe 1b that is located between the flow-passage switching device 13 and the pressure reducing device 15. The flow-passage switching device 13 may be, for example, an electric switching valve such as an electric three-way valve, or may be made up of two electric open/close valves provided at the pipes h1f and h1b. The flow-passage switching device 13 switches a flow passage for the heat medium 19 to a first flow passage that allows the heat medium 19 to circulate through the pressure reducing device 15, the heat-reception-side heat exchanger 16, the compressor 11, and the heat-storage heat exchanger 12 without flowing through the use-side heat exchanger or a second flow passage that allows the heat medium 19 to circulate through the pressure reducing device 15, the heat-reception-side heat exchanger 16, the compressor 11, and the heat-storage heat exchanger 12, and the use-side heat exchanger 14. That is, the flow-passage switching device 13 is controlled in response to a control signal from the controller 41 to switch the flow passage for the heat medium 19 flowing from the heat-storage heat exchanger 12 between the first flow passage that leads to the pressure reducing device 15 through the pipe h1b alone without extending through the use-side heat exchanger 14 and the second flow passage that leads to the pressure reducing device 15 through the pipes h1f, h1g, and h1b via the use-side heat exchanger 14. The flow-passage switching device 13 may not only switch the flow passage for the heat medium 19 flowing from the heat-storage heat exchanger 12 to either the first flow passage or the second flow passage, but switch the flow passage such that the ratio between flow rates at which the heat medium 19 flows through the first flow passage and the second flow passage is equalized to a predetermined ratio.

When the controller 41 causes the flow-passage switching device 13 to switch the flow passage for the heat medium 19 to the first flow passage that does not extend through the use-side heat exchanger 14, the heat medium 19 circulates through the compressor 11, the heat-storage heat exchanger 12, the pressure reducing device 15, and the heat-reception-side heat exchanger 16, and the heat received in the heat-reception-side heat exchanger 16 is transmitted to the heat-storage heat exchanger 12. By contrast, when the controller 41 causes the flow-passage switching device 13 to switch the flow passage for the heat medium 19 to the second flow passage that extends through the use-side heat exchanger 14, the heat medium 19 circulates through the compressor 11, the heat-storage heat exchanger 12, the use-side heat exchanger 14, the pressure reducing device 15, and the heat-reception-side heat exchanger 16, and the heat received in the heat-reception-side heat exchanger 16 is transmitted to the heat-storage heat exchanger 12 and the use-side heat exchanger 14.

The heat storage circuit 20 of the heat pump apparatus 100 includes the heat storage tank 21 connected to the heat storage medium flow passage 12b of the heat-storage heat exchanger 12 by a pipe h2c and the circulation pump 22 connected to the heat storage tank 21 by a pipe h2a. The circulation pump 22 is also connected to the heat storage medium flow passage 12b of the heat-storage heat exchanger 12 by a pipe h2b. The circulation pump 22 includes an electric motor whose rotation speed is controlled in response to a control signal from the controller 41, and the flow rate of the heat storage medium 29 that is circulated by the circulation pump 22 in the heat storage circuit 20 is adjusted by the controller 41. The pipe h2a is connected to lower part of the heat storage tank 21, and the pipe h2c is connected to upper part of the heat storage tank 21. The density of water which is the heat storage medium 29 stored in the heat storage tank 21 decreases when the water is heated to a high temperature, and the water is thus collected in upper part of the heat storage tank 21. Therefore, the temperature of water in the upper part of the heat storage tank 21 is higher than the temperature of water in lower part of the heat storage tank 21. The water corresponding to the heat storage medium 29 in the heat storage tank 21 flows out from the pipe h2a connected to the lower part of the heat storage tank 21, and is sent out by the circulation pump 22. The water sent out from the heat storage tank 21 changes to hot water by exchanging heat with the heat medium 19 in the heat-storage heat exchanger 12, and flows into the heat storage tank 21 through the pipe h2c connected to the upper part of the heat storage tank 21. As a result, heat received from the heat-reception-side heat exchanger 16 is stored in the water in the heat storage tank 21 to cause the water to change to how water.

Also, to the heat storage tank 21, pipes h2d and h2e are connected. The pipe h2d is a pipe for use in supplying from the tap, water corresponding to the heat storage medium 29, and the pipe h2e is a pipe for use in taking out from the heat storage tank 21, hot water corresponding to the high-temperature heat storage medium 29 and supplying the warm water. The pipe h2d is connected to the lower part of the heat storage tank 21, and the pipe h2e is connected to the upper part of the heat storage tank 21. Furthermore, the pipe h2e is connected to a pipe h2f via an electric mixing valve 23. To the electric mixing valve 23, a pipe h2g is connected. The pipe h2g branches off from the pipe h2d for use in supplying tap water. The electric mixing valve 23, whose opening degree is controlled by the controller 41, mixes hot water taken out from the heat storage tank 21 and tap water that is lower in temperature than the hot water and thereby adjusts the temperature of hot water, which is to be supplied, to a desired temperature for a user. The pipe h2d is connected to a water supply pipe 24a such as a water pipe, and tap water which is used as the heat storage medium 29 is supplied through the pipe 24a. The pipe h2f is also connected to a pipe 24b for use in supplying hot water to a kitchen, a lavatory, a bathroom or other rooms, and hot water corresponding to the heat storage medium 29 stored in the heat storage tank 21 is supplied through the pipe 24b. The hot water supplied through the pipe 24b is stored in the bathtub of the bath corresponding to the heat usage terminal 31, and serves as the heat usage medium 39.

The heat usage circuit 30 of the heat pump apparatus 100 includes the heat usage terminal 31 connected to the heat-use-medium flow passage 14b of the use-side heat exchanger 14 by pipes h3c and 33b and the circulation pump 32 connected to the heat usage terminal 31 by pipes 33a and h3a. The circulation pump 32 is also connected to the heat-use-medium flow passage 14b of the use-side heat exchanger 14 by a pipe h3b. The pipes 33a and 33b and the heat usage terminal 31 form part of the heat usage circuit 30, but are provided outside the heat pump apparatus 100. The circulation pump 32, as well as the circulation pump 22 of the heat storage circuit 20, is controlled by the controller 41, and the flow rate of the heat usage medium 39 that is circulated by the circulation pump 32 in the heat usage circuit 30 is adjusted by the controller 41. The pipes 33a and 33b are connected to the bathtub of the bath corresponding to the heat usage terminal 31. The water corresponding to the heat usage medium 39 stored in the bathtub flows out from the bathtub through the pipe 33a and is sent out by the circulation pump 32. The water sent out from the bathtub is heated by heat exchange with the heat medium 19 in the use-side heat exchanger 14 and flows into the bathtub through the pipe 33b. As a result, the water or hot water corresponding to the heat usage medium 39 stored in the bathtub of the bath corresponding to the heat usage terminal 31 is reheated or kept hot.

The heat pump apparatus 100 includes a first temperature detector T1 provided in the heat pump circuit 10, a second temperature detector T2 provided in the heat pump circuit 10, a third temperature detector T3, a fourth temperature detector T4, a sixth temperature detector T6, and a fifth temperature detector T5 provided in the heat usage circuit 30. The first temperature detector T1, the second temperature detector T2 and the third temperature detector T3 are provided in the heat pump circuit 10. The fourth temperature detector T4 is provided in the heat storage tank 21. The sixth temperature detector T6 is provided downstream of the hot-water supply electric mixing valve 23 for use in supply of hot water. The fifth temperature detector T5 is provided in the heat usage circuit 30. Furthermore, at the pipe h3a of the heat usage circuit 30, a water-level detector L1 is provided to detect the water level of water stored in the bathtub of the bath corresponding to the heat usage terminal 31. The first to sixth temperature detectors T1 to T6 and the water-level detector L1 are connected to the controller 41 by signal lines.

The first temperature detector T1 is provided at the pipe h1e connected to a downstream side of the heat-storage heat exchanger 12 and detects the temperature of the heat medium 19 having passed through the heat-storage heat exchanger 12. The location where the first temperature detector T1 is provided is not limited to the pipe h1e, and the first temperature detector T1 may be provided close to a downstream end of the heat medium flow passage 12a of the heat-storage heat exchanger 12. That is, the first temperature detector T1 may be provided at any location as long as it can estimate at that location the temperature of the heat medium 19 having passed through the heat-storage heat exchanger 12.

Furthermore, the first temperature detector T1 may be provided upstream of the heat storage medium flow passage 12b of the heat-storage heat exchanger 12, and for example, may be provided at the pipe h2b or h2a. The heat storage medium 29 which exchanges heat with the heat medium 19 passes through the pipes h2b and h2a. Thus, if the temperature of the heat storage medium 29 is high, the amount of heat exchange in the heat-storage heat exchanger 12 decreases, and the temperature of the heat medium 19 having passed through the heat-storage heat exchanger 12 also rises to a high value. Therefore, the temperature of the heat medium 19 having passed through the heat-storage heat exchanger 12 can be estimated. That is, since there is a correlation between the temperature of the heat storage medium 29 flowing into the heat-storage heat exchanger 12 and the temperature of the heat medium 19 having passed through the heat-storage heat exchanger 12, it may be considered that the detected temperature of the heat storage medium 29 which flows into the heat-storage heat exchanger 12 is based on the temperature of the heat medium 19 having passed through the heat-storage heat exchanger 12.

The second temperature detector T2 is provided at the pipe h1a connected to the discharge side of the compressor 11 and detects the temperature of the heat medium 19 discharged from the compressor 11. The third temperature detector T3 is provided at the pipe h1g connected to a downstream side of the heat medium flow passage 14a of the use-side heat exchanger 14 and detects the temperature of the heat medium 19 having passed through the use-side heat exchanger 14. The fourth temperature detector T4 is provided on an inner or outer wall of the heat storage tank 21 and detects the temperature of the water corresponding to the heat storage medium 29 stored in the heat storage tank 21. The fifth temperature detector T5 is provided at the pipe h3b connected to an upstream side of the heat-use-medium flow passage 14b of the use-side heat exchanger 14 and detects the temperature of the water corresponding to the heat usage medium 39 flowing into the use-side heat exchanger 14. With respect to the position of the fifth temperature detector T5, it suffices that the fifth temperature detector T5 is provided upstream of the use-side heat exchanger 14 and downstream of the heat usage terminal 31. The fifth temperature detector T5 may be provided at the pipe h3a.

The sixth temperature detector T6 is provided at the pipe h2f provided downstream of the electric mixing valve 23 and detects the temperature of hot water that is supplied through the pipe 24b. In order that the temperature of warm water detected by the sixth temperature detector T6 reach the desired hot-water supply temperature set by the user, the controller 41 controls the opening degree of the electric mixing valve 23 to adjust the flow rate of hot water corresponding to the heat storage medium 29 flowing from the pipe h2e into the electric mixing valve 23 and the flow rate of tap water flowing from the pipe h2g into the electric mixing valve 23.

The water-level detector L1 is provided at the pipe h3a by which the bathtub of the bath corresponding to the heat usage terminal 31 and the circulation pump 32 are connected to each other. The water-level detector L1 is, for example, a pressure sensor capable of detecting from a pressure the level of water in the bathtub. When the amount of the water corresponding to the heat usage medium 39 and stored in the bathtub is a predetermined amount or more, the level of water in the bathtub rises such that the water flows from the bathtub into the pipe h3a through the pipe 33a. As a result, the water-level detector L1 is immersed in the water corresponding to the heat usage medium 39. Therefore, the water-level detector L1 detects that the pressure detected by the water-level detector L1 varies from that before the water-level detector L1 is immersed in the water, and the level of water in the bathtub reaches the level of the water-level detector L1.

Figure 2:
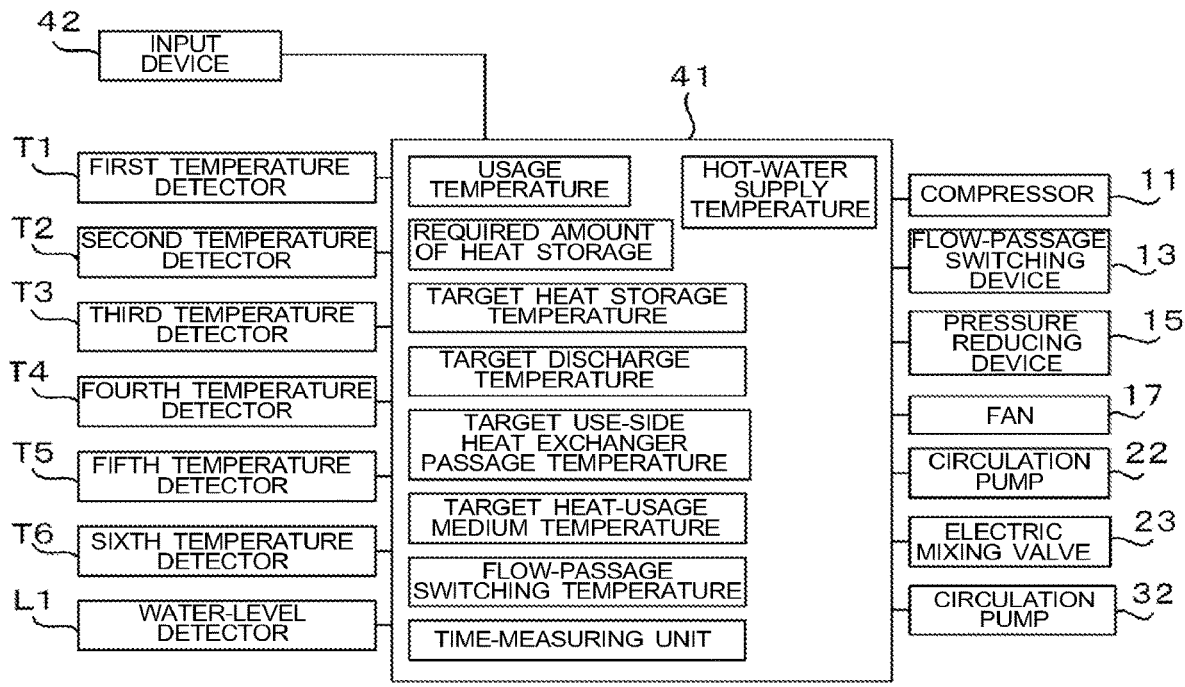
FIG. 2 is a block diagram of a configuration of a controller of the heat pump apparatus according to embodiment 1 of the present invention.

Next, the controller 41 of the heat pump apparatus 100 will be described. FIG. 2 is a block diagram of a configuration of a controller of the heat pump apparatus according to embodiment 1 of the present invention.

The controller 41 is, for example, a microprocessor. The controller 41 is connected to the first to sixth temperature detectors T1 to T6 and the water-level detector L1 by the signal lines, and receives temperature information detected by the first to sixth temperature detectors T1 to T6 and water-level information detected by the water-level detector L1. Also, the controller 41 is connected to the compressor 11, the flow-passage switching device 13, the pressure reducing device 15, the fan 17, the circulation pump 22, the electric mixing valve 23, and the circulation pump 32 by signal lines, and outputs control signals for controlling these components.

Furthermore, the controller 41 is connected via a cable or wireless signal line to an input device 42 for a user to input various requirements to the controller 41. In this case, the wireless signal line is, for example, a virtual signal line through which a signal is transmitted using electromagnetic waves such as infrared rays or radio waves as a medium. The input device 42 is, for example, a remote control unit or a home energy management system (HEMS) controller.

A user of the heat pump apparatus 100 inputs a desired usage temperature to the input device 42 to heat the water corresponding to the heat usage medium 39 as heat-retention or reheating such that the temperature of the water in the bathtub reaches the desired usage temperature. The usage temperature is a temperature at which the user wants to use the heat usage medium 39 stored in the bathtub. Furthermore, the user of the heat pump apparatus 100 inputs a desired hot-water supply temperature to the input device 42 to obtain hot water adjusted to the desired hot-water supply temperature. The hot-water supply temperature is the temperature of hot water flowing through the hot-water supply pipe 24b. Therefore, the controller 41 stores the usage temperature and hot-water supply temperature input using the input device 42. The controller 41 includes a storage unit, such as a memory, inside or outside the microprocessors, and stores various requirements in the storage unit.

The controller 41 includes a time-measuring unit that determines time and date. The controller 41 thus recognizes the time and date. The time-measuring unit corresponds to, for example, a timer function of the microprocessor. The controller 41 recognizes time by means of the time-measuring unit, and thus recognizes, for example, whether it is day or night right now. Furthermore, since the controller 41 recognizes the month and day of the date by means of the time-measuring unit, it recognizes, for example, whether it is summer or winter right now.

Further, the controller 41 stores data indicating a required amount of heat storage. The required amount of heat storage is an amount of heat of the heat storage medium 29 stored in the heat storage tank 21 that is required by the user and varies from one time period from another. For example, when the user inputs to the input device 42 data regarding the composition of his or her family such as how many people are in his or her family, the required amount of heat storage is calculated by the controller 41. In addition, the controller 41 may set the required amount of heat storage to an optimum value which varies in accordance with time and season. Alternatively, the required amount of heat storage may be input directly to the controller 41 from the input device 42.

The controller 41 stores in the storage unit, a target heat storage temperature, a target discharge temperature, a target use-side heat exchanger passage temperature, a target heat usage medium temperature, and a flow passage switching temperature. The target heat storage temperature is a target value of the temperature of the heat storage medium 29 in the heat storage tank 21 that is determined based on the required amount of heat storage. The target discharge temperature is a target value of the temperature of the heat medium 19 that is discharged from the discharge side of the compressor 11. The target use-side heat exchanger passage temperature is a target value of the temperature of the heat medium 19 having passed through the use-side heat exchanger 14. The target heat usage medium temperature is a target value of the temperature of the heat usage medium 39 that is used by the heat usage terminal 31. The flow passage switching temperature is a threshold temperature with reference to which the flow-passage switching device 13 switches the flow passage between the first flow passage that does not extend through the use-side heat exchanger 14 and the second flow passage that extends through the use-side heat exchanger 14.

The heat pump apparatus 100 is configured as described above.

Figure 3:
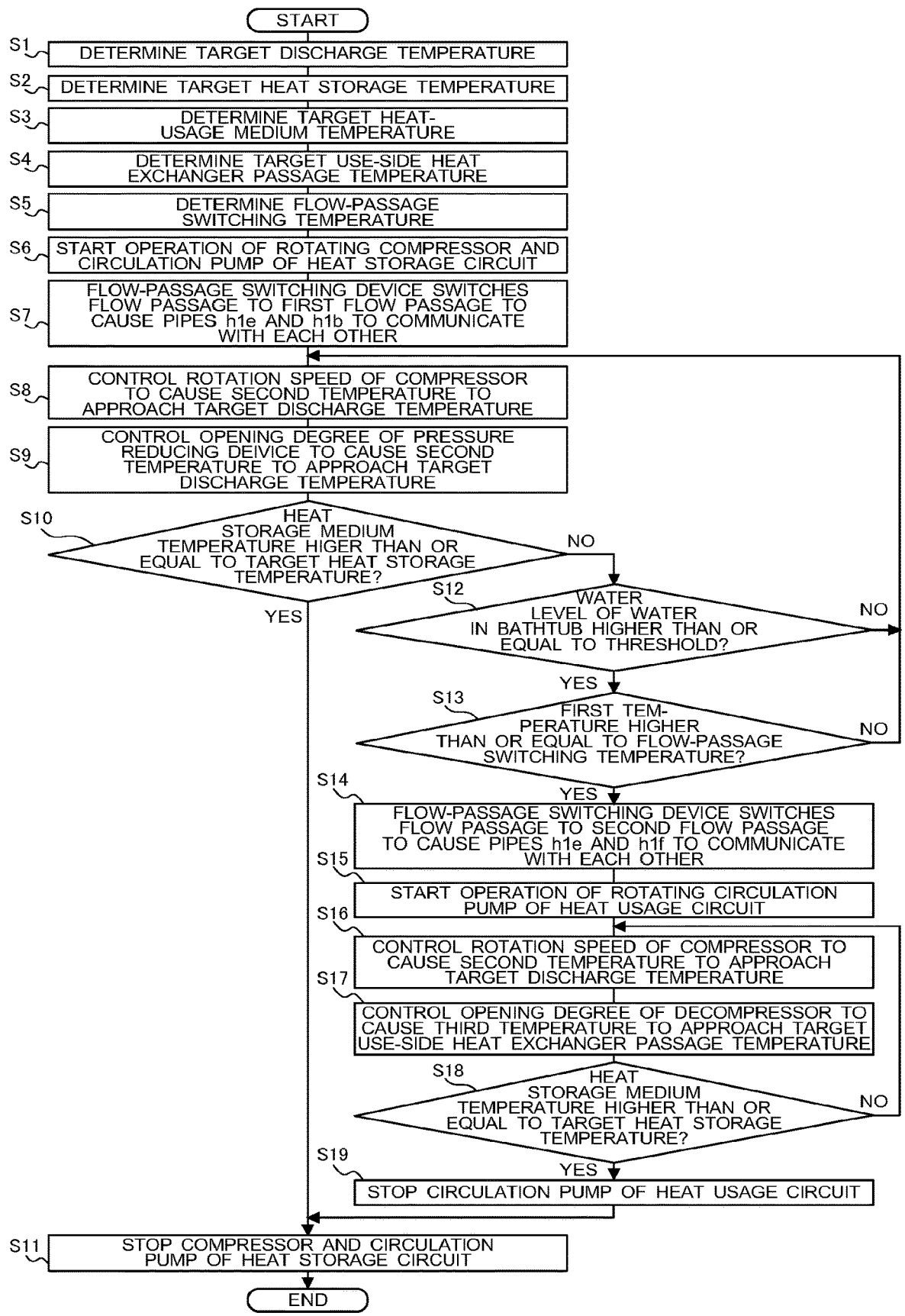
FIG. 3 is a flow chart of a control operation of the heat pump apparatus according to embodiment 1 of the present invention.

Next, it will be described how the heat pump apparatus 100 according to embodiment 1 of the present invention is operated. FIG. 3 is a flow chart of a control operation of the heat pump apparatus according to embodiment 1 of the present invention. The control operation as indicated in FIG. 3 is a control operation in the case where the water corresponding to the heat storage medium 29 is heated and stored in the heat storage tank 21 on the premise that hot water or water having a low temperature is stored as the heat usage medium 39 in the bathtub of the bath corresponding to the heat usage terminal 31. Such a situation occurs in the case where water having a low temperature is supplied from the water supply pipe 24a into the heat storage tank 21, for example, in the case where hot water in the heat storage tank 21 is poured into the bathtub of the bath corresponding to the heat usage terminal 31, or the hot water is used in a shower bath when the user has the shower bath.

First, as indicated in FIG. 3, in step S1, the controller 41 determines the target heat storage temperature based on the required amount of heat storage. The required amount of heat storage is an amount of heat storage which is required by the user and calculated by the controller 41 based on time or season and information such as the composition of the user's family that is input from the input device 42. In the case where the required amount of heat storage is large, the temperature of the heat storage medium 29 whose heat is stored in the heat storage tank 21 is raised; however, in the case where the temperature of the heat storage medium 29 is high, the efficiency of a heat pump is reduced as compared with the case where the temperature of the heat storage medium 29 is low. By contrast, in the case where the required amount of heat storage is small, the temperature of the heat storage medium 29 whose heat is stored in the heat storage tank 21 is reduced; however, in the case where the temperature of the heat storage medium 29 is low, the efficiency of the heat pump is increased as compared with the case where the temperature of the heat storage medium 29 is high. Therefore, the controller 41 determines the target heat storage temperature such that the temperature of the heat storage medium 29 stored in the heat storage tank 21 is set at the lowest possible temperature on the premise that an amount of heat which covers the required amount of heat storage is stored.

Next, in step S2, the controller 41 determines the target discharge temperature. Based on the target heat storage temperature, the target discharge temperature is determined higher than the target heat storage temperature. For example, the target discharge temperature may be equal to a value obtained by multiplying the target heat storage temperature and α+β. In this case, for example, α may be equal to 1.02, and β may be equal to 10 degrees C.

Next, in step S3, the controller 41 determines the target heat usage medium temperature. The target heat usage medium temperature is determined based on the usage temperature of the heat usage medium 39 at the heat usage terminal 31, which is input from the input device 42 by the user. For example, the controller 41 may determine the target heat usage medium temperature on the assumption that the target heat usage temperature is equal to the usage temperature.

Next, in step S4, the controller 41 determines the target use-side heat exchanger passage temperature. The target use-side heat exchanger passage temperature is determined based on the usage temperature of the heat usage medium 39 at the heat usage terminal 31, which is input from the input device 42 by the user or the target use-side heat exchanger passage temperature is determined based on the target heat usage medium temperature such that it is higher than the target heat usage medium temperature. For example, the controller 41 may assume that the target use-side heat exchanger passage temperature is equal to the target heat usage medium temperature plus γ. In this case, for example, γ may be equal to 2 degrees C.

Next, in step S5, the controller 41 determines the flow passage switching temperature. The flow passage switching temperature is a threshold temperature with reference to which the flow-passage switching device 13 switches the flow passage between the first flow passage and the second flow passage. The flow-passage switching device 13 switches the flow passage in the case where the temperature detected by the first temperature detector T1 becomes higher than or equal to the flow passage switching temperature. The temperature detected by the first temperature detector T1 will be hereinafter referred to as first temperature. Similarly, the temperatures detected by the second to sixth temperature detectors T2 to T6 are referred to as second to sixth temperatures, respectively. The first temperature is a temperature indicating the temperature of the heat medium 19 having passed through the heat-storage heat exchanger 12, which is detected by the first temperature detector T1. The second temperature is a temperature indicating the temperature of the heat medium 19 discharged from the compressor 11, which is detected by the second temperature detector T2. The third temperature is a temperature indicating the temperature of the heat medium 19 flowing from the use-side heat exchanger 14, which is detected by the third temperature detector T3. The controller 41 sets the flow passage switching temperature to a temperature higher than the usage temperature of the heat usage medium 39. This is because in the case where the flow-passage switching device 13 switches the flow passage for the heat medium 19 to the second flow passage that extends through the use-side heat exchanger 14, when the temperature of the heat medium 19 having passed through the heat-storage heat exchanger 12 is higher than the temperature of the heat usage medium 39 flowing into the use side head exchanger 14, heat can be transferred from the heat medium 19 to the heat usage medium 39 in the use-side heat exchanger 14.

As illustrated in FIG. 1, in the case where the first temperature detector T1 is provided at the pipe h1e located downstream of the heat-storage heat exchanger 12, the first temperature is the temperature of the heat medium 19 having passed through the heat-storage heat exchanger 12. As described above, the first temperature detector T1 may be provided at the pipe h2a or h2b of the heat storage circuit 20 or at the heat storage tank 21, as long as at the location, the first temperature detector T1 can measure the temperature of the heat medium 19 having passed through the heat-storage heat exchanger 12. However, the following description is made with respect to the case where the first temperature detector T1 is provided at the pipe h1e located downstream of the heat-storage heat exchanger 12, as an example in which the temperature of the heat medium 19 having passed through the heat-storage heat exchanger 12 can be measured with the highest degree of accuracy.

The controller 41 sets the flow passage switching temperature to a temperature lower than the target heat storage temperature. More preferably, the controller 41 should set the flow passage switching temperature to a temperature lower than the target heat storage temperature and higher than the target use-side heat exchanger passage temperature. For example, if the usage temperature of the heat usage medium 39 is set to 38 degrees C. by the user, the target heat usage medium temperature is 38 degrees C., and in the case where γ=2 degrees C., the target use-side heat exchanger passage temperature is 40 degrees C. Furthermore, for example, if the target heat storage temperature is 70 degrees C., the controller 41 may set the flow passage switching temperature to, for example, 50 degrees C. The target temperature and the flow passage switching temperature determined by the controller 41 are stored in the storage unit of the controller 41.

Next, in step S6, the controller 41 rotates the compressor 11 and the circulation pump 22 of the heat storage circuit 20. Thereby, the heat medium 19 is circulated in the heat pump circuit 10, and the heat storage medium 29 is circulated in the heat storage circuit 20. Then, in step S7, the controller 41 causes the flow-passage switching device 13 to switch the flow passage to the first flow passage, thereby causing the pipes h1e and h1b to communicate with each other. As a result, the heat medium 19 of the heat pump circuit 10 is circulated through the compressor 11, the heat-storage heat exchanger 12, the flow-passage switching device 13, the pressure reducing device 15, and the heat-reception-side heat exchanger 16.

Next, in step S8, the controller 41 controls the rotation speed of the compressor 11 such that the second temperature detected by the second temperature detector T2 provided on the discharge side of the compressor 11 approaches the target discharge temperature. Furthermore, in step S9, the controller 41 controls the opening degree of the pressure reducing device 15 such that the second temperature detected by the second temperature detector T2 provided on the discharge side of the compressor 11 approaches the target discharge temperature. The second temperature detected by the second temperature detector T2 provided on the discharge side of the compressor 11 is the temperature of the high-temperature and high-pressure heat medium 19 that is discharged from the compressor 11. The controller 41 may be configured to carry out only one of both steps S8 and S9. The controller 41 may carry out only step S8 to control only the rotation speed of the compressor 11 such that the second temperature approaches the target discharge temperature, with the opening degree of the pressure reducing device 15 kept constant. Alternatively, the controller 41 may carry out only step S9 to control only the opening degree of the pressure reducing device 15 such that the second temperature approaches the target discharge temperature, with the rotation speed of the compressor 11 kept constant.

Since the target discharge temperature is set higher than the target heat storage temperature, the temperature of the heat medium 19 that is discharged from the compressor 11 is higher than the temperature of the heat storage medium 29 which circulates in the heat storage circuit 20. Therefore, when the heat medium 19 is circulated in the heat pump circuit 10 and the heat storage medium 29 is circulated in the heat storage circuit 20, the heat storage medium 29 is heated by heat transferred from the heat medium 19, and the temperature of the heat storage medium 29 is thus raised. The amount of circulation of the heat medium 19, the amount of circulation of the heat storage medium 29, and the capacity of the heat-storage heat exchanger 12 may be set such that after the heat storage medium 29 passes through the heat-storage heat exchanger 12 once, and the temperature of the heat storage medium 29 reaches the target heat storage temperature, the heat storage medium 29 returns to the heat storage tank 21. Alternatively, they may be set such that when the heat storage medium 29 is circulated a number of times and thus gradually heated, the temperature of the heat storage medium 29 gradually approaches and then reaches the target heat storage temperature. In such a manner, in the case where it is set that the temperature of the heat storage medium 29 gradually approaches and then reaches the target heat storage temperature, it is possible to reduce the capacity of the heat-storage heat exchanger 12, thus reducing the cost of the heat pump apparatus 100.

In step S10, the controller 41 determines whether the temperature of the heat storage medium 29 is higher than or equal to the target heat storage temperature or not. The temperature of the heat storage medium 29 may be detected by the fourth temperature detector T4 provided in the heat storage tank 21. The position of the fourth temperature detector T4 is not limited to the inside of the heat storage tank 21. The fourth temperature detector T4 may be provided at the pipe h2a or h2b as long as it can detect the temperature of the heat storage medium 29 at that position.

In step S10, when the controller 41 determines that the temperature of the heat storage medium 29 is higher than or equal to the target heat storage temperature, the control by the controller 41 proceeds to step S11. In step S11, the controller 41 stops the compressor 11 and the circulation pump 22 of the heat storage circuit 20. Thereby, it is possible to store in the heat storage tank 21 an amount of heat that covers the required amount of heat storage.

It should be noted that in the case where the controller 41 changes the required amount of heat storage in accordance with the time or the season, since the target heat storage temperature also varies in accordance with the time or the season, the temperature of the heat storage medium 29 also varies in accordance with the time or the season in the case where the control by the controller 141 proceeds to step S11. In such a manner, since the controller changes the temperature of the heat storage medium 29 in accordance with the time determined by the time-measuring unit in the case where the control by the controller 141 proceeds to step S11 and a heat storage operation is stopped, energy consumption can be appropriately managed and energy saving can be achieved.

By contrast, in the case where in step S10, the controller 41 determines that the temperature of the heat storage medium 29 is lower than the target heat storage temperature, the control by the controller 41 proceeds to step S12. In step S12, the controller 41 determines whether the level of water in the bathtub of the bath corresponding to the heat usage terminal 31 is higher than or equal to a threshold or not. The level of water in the bathtub is detected by the water-level detector L1 provided at the pipe h3a. In the case where the bathtub contains an amount of water in which the water-level detector L1 is immersed, the controller 41 determines that the level of water in the bathtub is higher than or equal to the threshold. In the case where the level of water in the bathtub is lower than the threshold, the water corresponding to the heat usage medium 39 cannot circulate in the heat usage circuit 30, and the control by the controller 41 thus returns to step S8. Therefore, in the case where no water is stored in the bathtub, the flow-passage switching device 13 does not switch the flow passage of the heat pump circuit 10 to the second flow passage, and the heat medium 19 thus flows only in the first flow passage which does not extend through the use-side heat exchanger 14, and the heat received from the heat-reception-side heat exchanger 16 is transmitted only to the heat-storage heat exchanger 12.

In the case where in step S12, the controller 41 determines that the level of water in the bathtub is higher than or equal to the threshold, the control by the controller 41 proceeds to step S13. In step S13, the controller 41 determines whether the first temperature detected by the first temperature detector T1 is higher than or equal to the flow passage switching temperature or not. The first temperature is the temperature of the heat medium 19 having passed through the heat-storage heat exchanger 12, and in the case where heat is sufficiently transmitted from the heat medium 19 to the heat storage medium 29 in the heat-storage heat exchanger 12, the first temperature is sufficiently low. By contrast, in the case where the temperature of the heat storage medium 29 is raised and heat has not been sufficiently transmitted from the heat medium 19 to the heat storage medium 29, the first temperature, which is the temperature of the heat medium 19 having passed through the heat-storage heat exchanger 12, is raised. In the case where in step S13, the controller 41 determines that the first temperature detected by the first temperature detector T1 is lower than the flow passage switching temperature, heat can be sufficiently transmitted from the heat medium 19 to the heat storage medium 29, and the control by the controller 41 thus returns to step S8.

By contrast, in the case where in step S13, the controller 41 determines that the first temperature detected by the first temperature detector T1 is higher than or equal to the flow passage switching temperature, the control by the controller 41 proceeds to step S14. In step S14, the controller 41 causes the flow-passage switching device 13 to switch the flow passage for the heat medium 19 flowing from the heat-storage heat exchanger 12 to the second flow passage that leads to the pressure reducing device 15 via the use-side heat exchanger 14. As a result, the pipes h1e and h1f communicate with each other via the flow-passage switching device 13.

Next, in step S15, the controller 41 rotates the circulation pump 32 of the heat usage circuit 30. Thereby, the water corresponding to the heat usage medium 39 is circulated in the heat usage circuit 30, and heat exchange is performed between the heat medium 19 and the heat usage medium 39 in the use-side heat exchanger 14. Although the heat medium 19 which flows into the use-side heat exchanger 14 has once transferred heat in the heat-storage heat exchanger 12, the first temperature, which is the temperature of the heat medium 19 passing through the heat-storage heat exchanger 12, is higher than or equal to than the flow passage switching temperature, and the temperature of the heat medium 19 is sufficiently higher than the temperature of the heat usage medium 39. Therefore, heat is transmitted from the heat medium 19 to the heat usage medium 39 in the use-side heat exchanger 14, and the temperature of the water corresponding to the heat usage medium 39 is raised. Then, the heat medium 19, whose temperature has sufficiently decreased, flows out of the use-side heat exchanger 14.

Next, in step S16, the controller 41 controls the rotation speed of the compressor 11 such that the second temperature detected by the second temperature detector provided on the discharge side of the compressor 11 approaches the target discharge temperature. The second temperature is the temperature of the high-temperature and high-pressure heat medium 19 discharged from the compressor 11. Furthermore, in step S17, the controller 41 controls the opening degree of the pressure reducing device 15 such that the third temperature detected by the third temperature detector T3 provided downstream of the use-side heat exchanger 14 of the heat pump circuit 10 approaches the target use-side heat exchanger passage temperature. The third temperature is the temperature of the heat medium 19 which flows into the pressure reducing device 15.

Next, in step S18, the controller 41 determines whether the temperature of the heat storage medium 29 is higher than or equal to the target heat storage temperature or not. The temperature of the heat storage medium 29 may be detected by the fourth temperature detector T4 provided in the heat storage tank 21. In the case where in step S18, the controller 41 determines that the temperature of the heat storage medium 29 is higher than or equal to the target heat storage temperature, the control by the controller 41 proceeds to step S19. In step S19, the controller 41 stops the circulation pump 32 of the heat usage circuit 30. As a result, heating of the water corresponding to the heat usage medium 39 in the bathtub is stopped. By contrast, in the case where in step S18, the controller 41 determines that the temperature of the heat storage medium 29 is lower than the target heat storage temperature, the control by the controller 41 returns to step S16, and the above steps from step S16 onward are repeated until the temperature of the heat storage medium 29 becomes higher than or equal to the target heat storage temperature.

After in step S19, the controller 41 stops the circulation pump 32 of the heat usage circuit 30, the control by the controller 41 proceeds to step S11. The controller 41 stops the compressor 11 and the circulation pump 22 of the heat storage circuit 20. In the heat storage tank 21, an amount of heat that covers the required amount of heat storage is stored.

It should be noted that there is a case where at the point of time when the temperature of the heat storage medium 29 in the heat storage tank 21 reaches the target heat storage temperature or higher, the temperature of hot water in the bathtub of the bath corresponding to the heat usage terminal 31 is lower than the target heat usage medium temperature. This state may be left as it is in the case where the user does not immediately use the bathtub of the bath corresponding to the heat usage terminal 31. However, in the case where the user wants to immediately use the bathtub at the usage temperature, the hot water corresponding to the heat usage medium 39 in the bathtub can be heated by rotating the compressor 11 and the circulation pump 32 of the heat usage circuit 30, with the circulation pump 22 of the heat storage circuit 20 kept in the stopped state after step S11. In this case, since the flow-passage switching device 13 has switched the flow passage to the second flow passage, the heat medium 19 is circulated through the heat-reception-side heat exchanger 16, the heat-storage heat exchanger 12, and the use-side heat exchanger 14. Since the circulation pump 22 of the heat storage circuit 20 is in the stopped state, the amount of heat transmitted from the heat medium 19 to the heat storage medium 29 in the heat-storage heat exchanger 12 is very small. Therefore, the heat usage medium 39 which circulates in the heat usage circuit 30 can be heated by transmitting, to the use-side heat exchanger 14, most of the heat received from the heat source in the heat-reception-side heat exchanger 16. Then, it suffices that when the fifth temperature, which is the temperature of the heat usage medium 39, and detected by the fifth temperature detector T5, reaches the target heat usage medium temperature, the compressor 11 and the circulation pump 32 of the heat usage circuit 30 are stopped.

Similarly, also in the case of reheating the hot water corresponding to the heat usage medium 39 to keep hot the hot water in the bathtub of the bath corresponding to the heat usage terminal 31 as heat-retention, it suffices that the flow-passage switching device 13 is caused to switch the flow passage to the second flow passage, and the compressor 11 the circulation pump 32 of the heat usage circuit 30 is rotated, with the circulation pump 22 of the heat storage circuit 20 kept in the stopped state, to thereby heat the hot water corresponding to the heat usage medium 39 in the bathtub and then carry out heat-retention.

Furthermore, the flow rate of the heat storage medium 29 flowing through the heat storage circuit 20 may be reduced by reducing the rotation speed without stopping the circulation pump 22 of the heat storage circuit 20. That is, the controller 41 may change the ratio between the flow rate of the heat storage medium 29 and the flow rate of the heat usage medium 39 by controlling the circulation pump 22 of the heat storage circuit 20 and the circulation pump 32 of the heat usage circuit 30. Thereby, it is possible to transmit the heat received in the heat-reception-side heat exchanger 16 to the heat storage medium 29 and the heat usage medium 39 at a desired ratio.

Furthermore, for example, the controller 41 may control the circulation pump 22 of the heat storage circuit 20 and the circulation pump 32 of the heat usage circuit 30 based on the result of time measurement by the time-measuring unit of the controller 41. To be more specific, the user inputs in advance using the input device 42 the time in which he or she wants to use the bathtub of the bath corresponding to the heat usage terminal 31. For example, in the case where the user inputs a time period between 7 p.m. to 10 p.m. as time for usage of the bathtub, once the temperature of the heat storage medium 29 reaches the target heat storage temperature, in a time period from 11 p.m. to 6 a.m. on the next day, the controller 41 of the heat pump apparatus 100 controls the flow-passage switching device 13 to switch the flow passage to the first flow passage that does not extend through the use-side heat exchanger 14 and stops the compressor 11 and the circulation pump 22 of the heat storage circuit 20 even if the temperature of the hot water in the bathtub does not reach the target heat usage medium temperature. By contrast, in the case where the time determined by the time-measuring unit of the controller 41 is 6 p.m. and the temperature of the warm water in the bathtub does not reach the target heat usage medium temperature, even if the temperature of the heat storage medium 29 reaches the target heat storage temperature, the controller 41 controls the flow-passage switching device 13 to switch to the second flow passage that extends through the use-side heat exchanger 14, stops the circulation pump 22 of the heat storage circuit 20, and rotates the circulation pump 32 of the heat usage circuit 30 to heat the hot water corresponding to the heat usage medium 39 in the bathtub. In such a manner, since the controller 41 controls the flow-passage switching device 31 based on the time determined by the time-measuring unit, and controls heat storage and heat usage, energy consumption of home or a region can be optimized and power saving can be achieved.

The heat pump apparatus 100 is operated as described above.

Next, the advantages of the heat pump apparatus 100 of the present invention will be described.

In an existing heat pump apparatus in which a heat storage medium is heated using a heat pump and heat is stored, if storage of heat in a heat storage tank proceeds during a heat storage operation, the temperature of the heat storage medium rises. When the temperature of the heat storage medium rises, the amount of heat transferred from a heat medium in a heat pump circuit to the heat storage medium in a heat-storage heat exchanger decreases, and the temperature of the heat medium which returns to a compressor rises. Thus, the pressure (discharge pressure) of the heat medium discharge from the compressor rises as the temperature of the heat storage medium rises. In general, since the efficiency of a heat pump apparatus is high when the discharge pressure is low, in the existing heat pump apparatus, the efficiency of the heat pump decreases as the temperature of the heat storage medium rises.

On the other hand, in the heat pump apparatus 100 according to embodiment 1 of the present invention, the use-side heat exchanger 14 is provided downstream of the heat-storage heat exchanger 12 of the heat pump circuit 10, with the flow-passage switching device 13 interposed between the use-side heat exchanger 14 and the heat-storage heat exchanger 12, and the flow-passage switching device 13 switches the flow passage for the heat medium 19 having passed through the heat-storage heat exchanger 12 between the first flow passage that leads to the pressure reducing device 15 without extending through the use-side heat exchanger 14 and the second flow passage that leads to the pressure reducing device 15 via the use-side heat exchanger 14. Furthermore, since the heat pump apparatus 100 includes the first temperature detector T1 that detects the first temperature which is the temperature of the heat medium 19 having passed through the heat-storage heat exchanger 12, it can detect that the temperature of the heat storage medium 29 rises and the amount of heat transferred from the heat medium 19 to the heat storage medium 29 decreases.

In the heat pump apparatus 100 of the present invention, in the case where the first temperature becomes higher than or equal to a predetermined flow passage switching temperature, since the controller 41 causes the flow-passage switching device 13 to switch the flow passage for the heat medium 19 to the second flow passage, heat is transferred from the heat medium 19 to the heat usage medium 39 in the use-side heat exchanger 14, whereby the temperature of the heat medium 19 which returns to the compressor 11 can be reduced. That is, in the heat pump apparatus 100, even if the temperature of the heat storage medium 29 rises, the heat medium 19 transfers heat in the heat-storage heat exchanger 12, and then further transfers heat in the use-side heat exchanger 14, whereby the heat medium 19 can transfer a larger amount of heat than in the case where the heat medium transfers heat only in the heat-storage heat exchanger 12. As a result, it is possible to reduce the pressure at which the heat medium 19 is discharged from the compressor 11, and improve the efficiency of the heat pump.

Furthermore, since the heat transferred from the heat medium 19 to the heat usage medium 39 in the use-side heat exchanger 14 can be applied to reheating of the hot water in the bath corresponding to the heat usage terminal 31 or heat-retention in which the hot water in the bathtub is kept hot, it is possible to effectively use heat while improving the efficiency of the heat pump.

Embodiment 2

Figure 4:
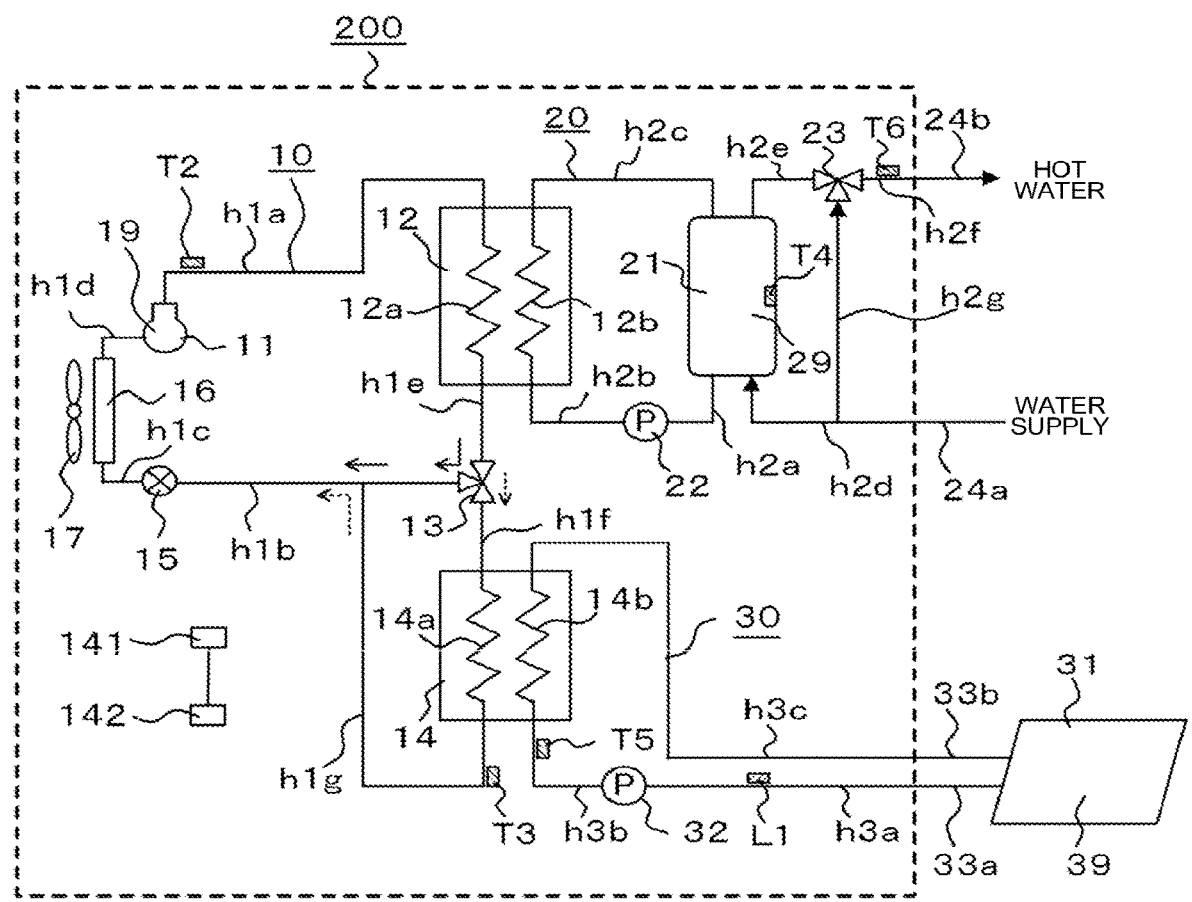
FIG. 4 is a schematic view illustrating a configuration of a heat pump apparatus according to embodiment 2 of the present invention.
Figure 5:
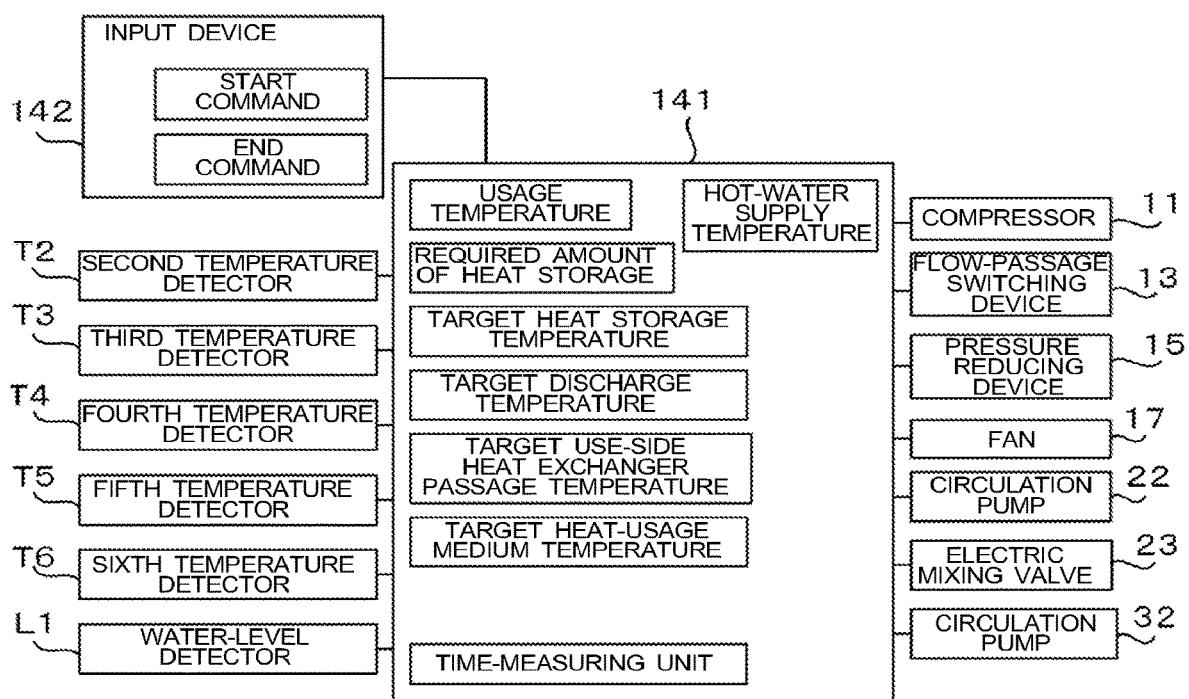
FIG. 5 is a block diagram of a configuration of a controller of the heat pump apparatus according to embodiment 2 of the present invention.

FIG. 4 is a schematic view illustrating a configuration of a heat pump apparatus according to embodiment 2 of the present invention. FIG. 5 is a block diagram of a configuration of a controller of the heat pump apparatus according to embodiment 2 of the present invention. In FIGS. 4 and 5, components which are the same as or equivalent to those in FIGS. 1 and 2 are denoted by the same reference signs; and their descriptions will thus be omitted. Embodiment 2 is different from embodiment 1 on the point that in embodiment 2, a controller 141 controls the flow-passage switching device 13 in response to a command from a user or a control device.

As illustrated in FIG. 4, in a heat pump apparatus 200 according to embodiment 2, a first temperature detector T1 is not provided at the pipe h1e provided downstream of the heat-storage heat exchanger 12 of the heat pump circuit 10. Therefore, the controller 141 does not control the flow-passage switching device 13 based on the temperature of the heat medium 19 having passed through the heat-storage heat exchanger 12, and does not switch the flow passage between the first flow passage that does not extend through the use side heat exchange 14 and the second flow passage that extends through the use side heat exchange 14, based on the temperature of the heat medium 19 having passed through the heat-storage heat exchanger 12. The controller 141 of the heat pump apparatus 200 controls the flow-passage switching device 13 in response to a start command or an end command which is input to an input device 142 connected to the controller 141 by a cable or wirelessly. Therefore, as indicated in FIG. 5, the controller 141 does not store a flow passage switching temperature in a storage unit such as a memory.

The heat pump apparatus 200 may include a first temperature detector T1 that detects the temperature of the heat medium 19 having passed through the heat-storage heat exchanger 12 as described regarding embodiment 1, and further have a function of switching the flow-passage switching device 13 based on the first temperature that is the temperature of the heat medium 19 which is detected by the first temperature detector T1. That is, the heat pump apparatus 100 as described regarding embodiment 1 may further have the function of the heat pump apparatus 200 as described regarding embodiment 2.

In embodiment 2, the heat storage medium 29 is water, and the heat usage medium 39 is also water, as in embodiment 1. As in embodiment 1, hot water heated and stored in the heat storage tank 21 is supplied not only to a kitchen, a lavatory, a shower or the like, but to the bathtub of the bath corresponding to the heat usage terminal 31 in order that the bathtub be filled with the hot water. Furthermore, the heat usage terminal 31 is a bath, and water corresponding to the heat usage medium 39 is supplied into the bathtub of the bath.

As indicated in FIG. 5, the input device 142 includes a command unit (not indicated) that transmits to the controller 141 a start command to start usage of the use-side heat exchanger 14 and an end command to end the usage of the use-side heat exchanger 14. The command unit may be a reheating start button and a reheating end button or a heat-retention start button and a heat-retention end button, which are provided on a remote control unit corresponding to the input device 142. In the case of reheating the bathtub, a start command to start reheating is a start command to start usage of the use-side heat exchanger 14, and an end command to end reheating is an end command to end the usage of the use-side heat exchanger 14. Furthermore, in the case of keeping the hot water in the bathtub hot as heat-retention, a start command to start heat-retention is a start command to start usage of the use-side heat exchanger 14, and an end command to end heat-retention is an end command to end the usage of the use-side heat exchanger 14. Furthermore, in the case where the input device 142 is an HEMS controller, the command unit may be a microprocessor provided in the HEMS controller. The following description is made with respect to the case where the input device 142 is a remote control unit and the command unit is a button provided on the remote control unit.

Figure 6:
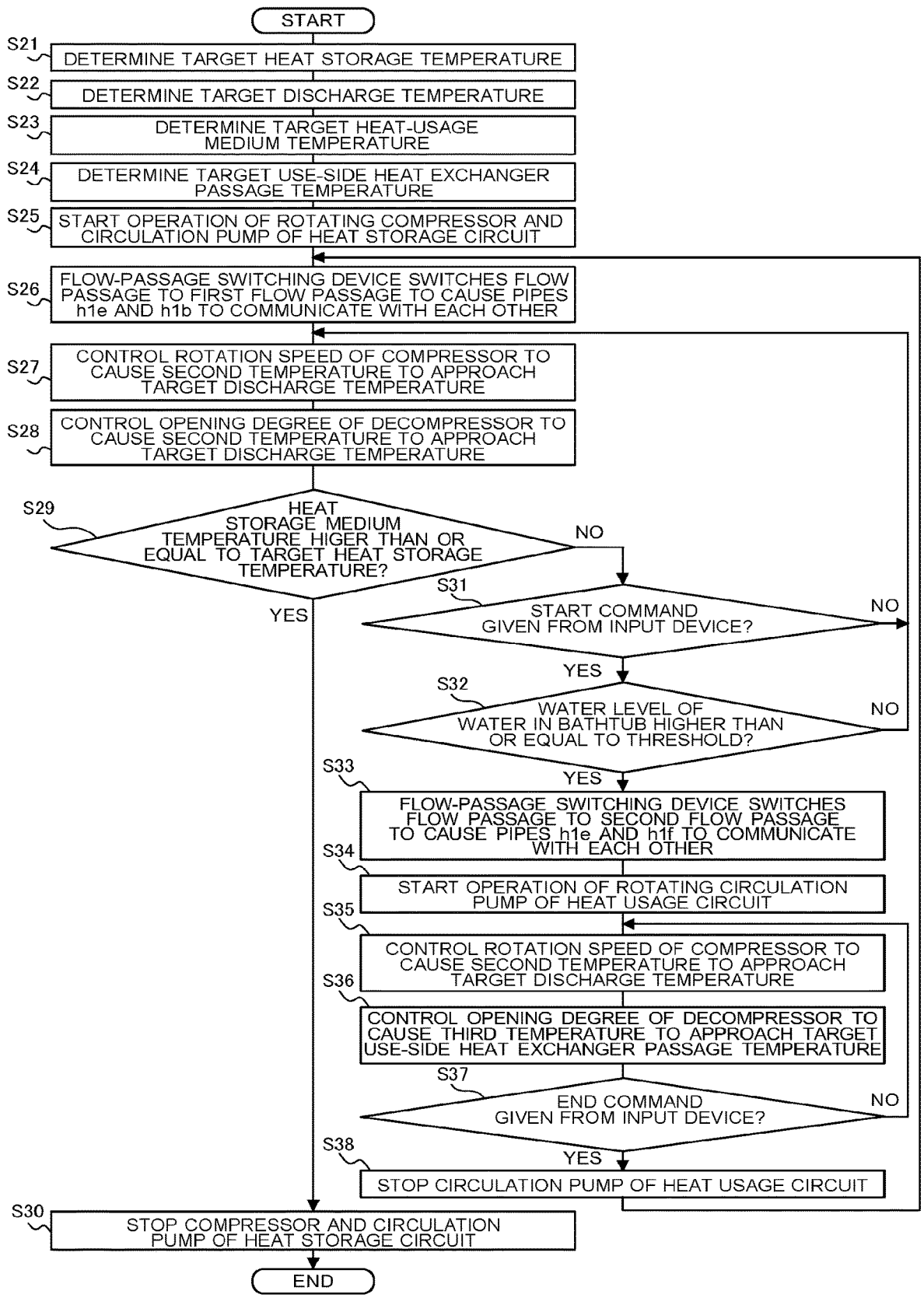
FIG. 6 is a flow chart of a control operation of the heat pump apparatus according to embodiment 2 of the present invention.

FIG. 6 is a flow chart of a control operation of the heat pump apparatus according to embodiment 2 of the present invention. The control operation as indicated in FIG. 6 is a control operation to be performed when a command to reheat the heat usage medium 39 in the bathtub is input to the input device 142 in the case where water corresponding to the heat storage medium 29 is heated and stored in the heat storage tank 21, with hot water or low-temperature water stored as the heat usage medium 39 in the bathtub of the bath corresponding to the heat usage terminal 31. In response to a start command to start usage of the use-side heat exchanger 14 from the input device 142, the controller 141 causes the flow-passage switching device 13 to switch the flow passage from the first flow passage that does not extend through the use-side heat exchanger 14 to the second flow passage that extends through the use-side heat exchanger 14. Such a situation occurs, for example, in the case where the heat storage medium 29 in the heat storage tank 21 is heated and heat is stored, when the user feels that the temperature of the hot water in the bathtub is low and causes the hot water to be reheated.

First, in steps S21 to S24, the controller 141 of the heat pump apparatus 200 determines the target heat storage temperature, the target discharge temperature, the target heat usage medium temperature, and the target use-side heat exchanger passage temperature, respectively, as in steps S1 to S4 of embodiment 1.

Next, in steps S25 to S28, the controller 141 of the heat pump apparatus 200 rotates the compressor 11 and the circulation pump 22 of the heat storage circuit 20, causes the flow-passage switching device 13 to switch the flow passage to the first flow passage to make the pipes h1*e* and h1*b* communicate with each other, and controls the rotation speed of the compressor 11 and/or the opening degree of the pressure reducing device 15 such that the second temperature detected by the second temperature detector T1 provided on the discharge side of the compressor 11 approaches the target discharge temperature, as in steps S6 to S9 of embodiment 1. As a result, a heat storage operation in which the heat storage medium 29 of the heat-storage heat exchanger 12 is heated by heat received from the heat-reception-side heat exchanger 16 is performed.

Next, in step S29, the controller 141 determines whether the temperature of the heat storage medium 29 is higher than or equal to the target heat storage temperature or not, based on the fourth temperature detected by the fourth temperature detector T4 provided in the heat storage tank 21. When the controller 141 determines that the temperature of the heat storage medium 29 is higher than the target heat storage temperature, the control by the controller 141 proceeds to step S30 and the controller 141 stops the compressor 11 and the circulation pump 22 of the heat storage circuit 20. Thereby, as described regarding embodiment 1, an amount of heat which covers the required amount of heat storage is stored in the heat storage tank 21, as described in embodiment 1.

By contrast, in step S29, when the controller 141 determines that the temperature of the heat storage medium 29 is lower than the target heat storage temperature, the control by the controller 141 proceeds to step S31. In step S31, the controller 141 determines whether a start command is given from the input device 142 or not. The start command from the input device 142 is transmitted from the input device 142 to the controller 141, for example, when the user presses a reheat button on the remote control unit corresponding to the input device 142. When the controller 141 determines that a start command is not given from the input device 142, the control by the controller 141 returns to step S27. On the other hand, when the controller 141 determines that a start command is given from the input device 142, the control by the controller 141 proceeds to step S32. In step S33, the controller 141 determines whether the level of water in the bathtub of the bath corresponding to the heat usage terminal 31 is higher than or equal to a threshold. In the case where the level of water in the bathtub is lower than the threshold, the control by the controller 141 returns to step S27. In the case where the level of water in the bathtub is higher than or equal to the threshold, the control by the controller 141 proceeds to step S32.

In step S33, the controller 141 controls the flow-passage switching device 13 to switch the flow passage for the heat medium 19 flowing from the heat-storage heat exchanger 12 to the second flow passage that leads to the pressure reducing device 15 via the use-side heat exchanger 14.

Next, in steps S34 to S36, the controller 141 rotates the circulation pump 32 of the heat usage circuit 30, controls the rotation speed of the compressor 11 such that the second temperature detected by the second temperature detector T2 provided on the discharge side of the compressor 11 approaches the target discharge temperature, and controls the opening degree of the pressure reducing device 15 such that the third temperature detected by the third temperature detector T3 provided downstream of the use-side heat exchanger 14 of the heat pump circuit 10 approaches the target use-side heat exchanger passage temperature, as in steps S15 to S17 of embodiment 1. Thereby, the water corresponding to the heat usage medium 39 is circulated in the heat usage circuit 30, and heat exchange is performed between the heat medium 19 and the heat usage medium 39 in the use-side heat exchanger 14.

As a result, the heat medium 19 discharged in a high temperature and high pressure state from the compressor 11 transfers heat in the heat-storage heat exchanger 12, and then further transfers heat in the use-side heat exchanger 14. That is, the heat medium 19 transmits a larger amount of heat than in the case where the heat medium 19 transfers heat only in the heat-storage heat exchanger 12. Therefore, it is possible to reduce a decrease in the efficiency of the heat pump as described in embodiment 1.

The controller 141 controls the rotation speed of the circulation pump 22 of the heat storage circuit 20 and the rotation speed of the circulation pump 32 of the heat usage circuit 30 to control the flow rate of the heat medium 29 flowing in the heat storage circuit 20 and the flow rate of the heat usage medium 39 flowing in the heat usage circuit 30. For example in the case where the difference between the desired usage temperature input by the user using the input device 142 in order to reheat the hot water in the bathtub and the temperature of the hot water corresponding to the heat usage medium 39 in the bathtub of the bath corresponding to the heat usage terminal 31 is great, the rotation speed of the circulation pump 22 of the heat storage circuit 20 may be reduced as occasion needs. That is, the controller 141 may control the circulation pump 22 of the heat storage circuit 20 and the circulation pump 32 of the heat usage circuit 30 to change the ratio between the flow rate of the heat storage medium 29 and the flow rate of the heat usage medium 39. In this case, since the amount of circulation per unit time of the heat storage medium 29 that circulates in the heat storage medium 20 decreases, the amount of heat that is stored per unit time in the heat storage tank 21 also decreases; however, the amount of heat by which the heat usage medium 39 is heated can be increased. Thereby, it is possible to continue to store heat in the heat storage tank 21 while reheating the hot water in the bathtub without losing user convenience.

Next, in step S37, the controller 141 determines whether an end command is given from the input device 142 or not. The end command from the input device 142 is transmitted from the input device 142 to the controller 141 in the case where the user presses the reheating stop button or the heat-retention stop button on the remote control unit. When the controller 141 determines that an end command is not given from the input device 142, the control by the controller 141 returns to step S35. By contrast, when the controller 141 determines that an end command is given from the input device, the control by the controller 141 proceeds to step S38.

In step S38, the controller 141 stops the circulation pump 32 of the heat usage circuit 30. Then, the control by the controller 141 returns to step S26, and the controller 141 controls the flow-passage switching device 13 to switch the flow passage for the heat medium 19 having passed through the heat-storage heat exchanger 12 to the first flow passage that leads to the pressure reducing device 15 without extending through the use-side heat exchanger 14, and continues the heat storage operation.

Then, in step S29, when the controller 141 determines that the temperature of the heat storage medium 29 is higher than or equal to the target heat storage temperature, the controller 141 stops the compressor 11 and the circulation pump 22 of the heat storage circuit 20 in step S30. Because of those operations, in the heat storage tank 21, an amount of heat that covers the required amount of heat storage is stored.

As described above, in the heat pump apparatus 200, even in the case where the temperature of the heat storage medium 29 does not become higher than or equal to the target heat storage temperature, the heat storage medium 29 is heated and heat is stored in the heat storage tank 21, when the user gives a command to start heating of the heat usage medium 39 using the input device 142, and the controller 141 determines that a start command is given from the input device 142 and can thus control the flow-passage switching device 13. As a result, the user can start application of the heat received in the heat-reception-side heat exchanger 16 to reheating or heat-retention of the hot water in the bath corresponding to the heat usage terminal 31 when users wants to do so, and the user can end the application of the heat received in the heat-reception-side heat exchanger 16 when the user wants to do so. Therefore, the heat pump apparatus 200 does not lose user convenience. In the case where the user uses the heat received in the heat-reception-side heat exchanger 16, the heat can be used in the use-side heat exchanger 14. Therefore, the start of usage of heat means the start of usage of the use-side heat exchanger 14.

Further, since the controller 141 controls the rotation speed of the circulation pump 22 of the heat storage circuit 20 and the rotation speed of the circulation pump 32 of the heat usage circuit 30, the ratio between the amount of heat of the heat received by the heat medium 19 in the heat-reception-side heat exchanger 16, that is transferred to the heat storage medium 29 in the heat-storage heat exchanger 12, and the amount of heat of the heat received by the heat medium 19 in the heat-reception-side heat exchanger 16, that is transferred to the heat usage medium 39 in the use-side heat exchanger 14, can be adjusted. It is therefore possible to further improve user convenience.

Furthermore, in the heat pump apparatus 200 according to embodiment 2, when the user inputs a start command to heat the heat storage medium, heat received in the heat-reception-side heat exchanger 16 can be stored in the heat storage tank 21 by the heat pump, and can be also applied to, for example, reheating of the bath corresponding to the heat usage terminal 31, while a decrease in the efficiency of the heat pump can be reduced.

Embodiment 3

Figure 7:
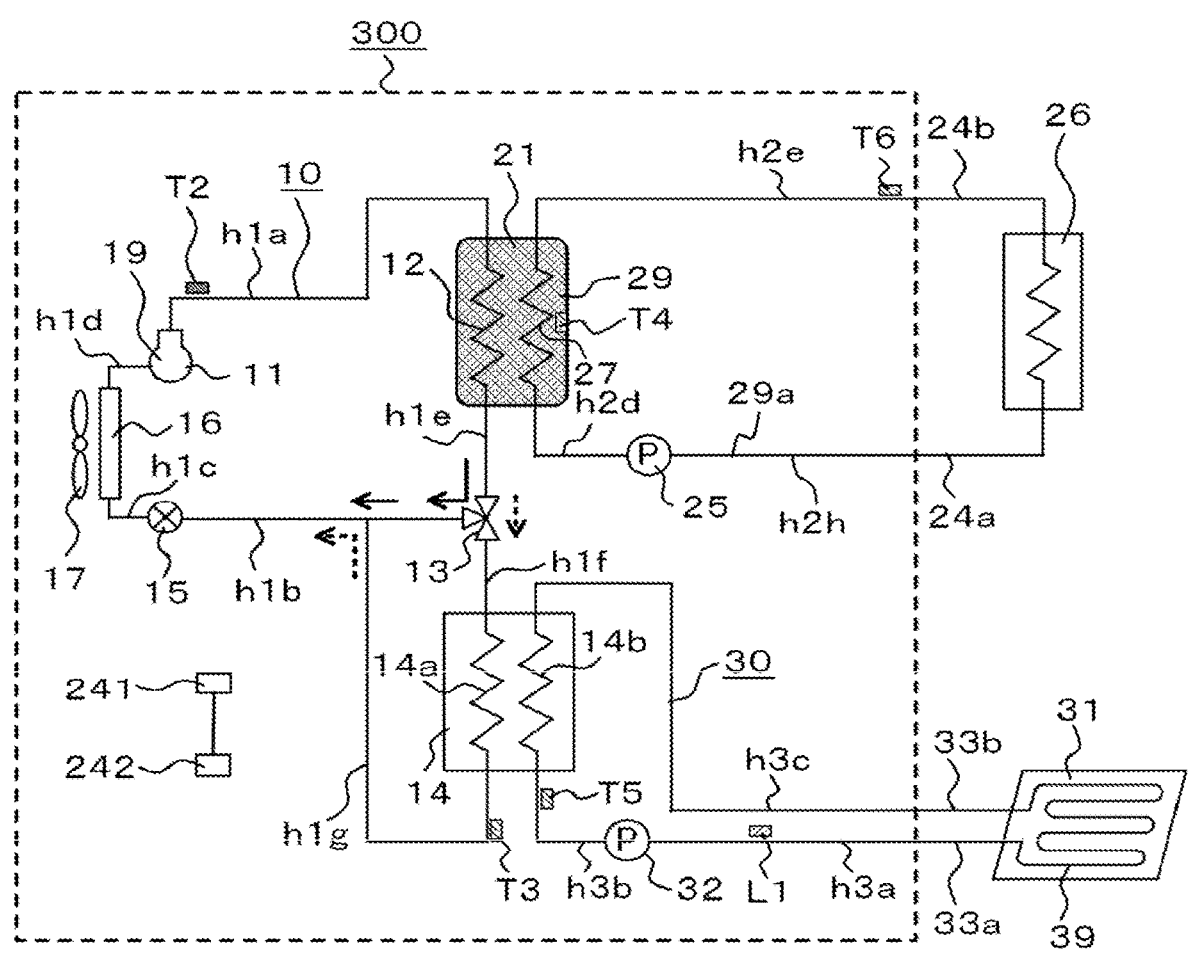
FIG. 7 is a schematic view illustrating a configuration of a heat pump apparatus according to embodiment 3 of the present invention.

FIG. 7 is a schematic view illustrating a configuration of a heat pump apparatus according to embodiment 3 of the present invention. In FIG. 7, components which are the same as or equivalent to those in FIGS. 1 and 4 are denoted by the same reference signs, and their descriptions will thus be omitted. Embodiment 3 is different from embodiment 1 or 2 on the point that in embodiment 3, the heat storage medium 29 housed in the heat storage tank 21 is a heat storage medium containing a latent heat storage material.

Embodiment 3 will be described by referring to the case wherein heat stored in the heat storage medium 29 is applied to a panel heater 26, not to hot-water supply, and the heat usage terminal 31 is a floor heating appliance, not a bath. However, as described regarding embodiments 1 and 2, heat stored in the heat storage medium 29 may be applied to hot-water supply, and the heat usage terminal 31 may be a bath. In this case, it suffices that the heat pump apparatus is configured such that water is made to flow through a heat exchanger provided with a flow passage in which the water exchanges heat with the heat storage medium 29 containing a latent heat storage material, and this water is heated by the heat of the heat storage medium 29, and is supplied as hot water. Similarly, in each of the heat pump apparatuses described regarding embodiments 1 and 2, heat stored in the heat storage medium 29 may be used in a heater such as a panel heater or a floor heating appliance, and the heat usage terminal 31 may be a heater such as a panel heater or a floor heating appliance. In each of the heat pump apparatuses according to embodiments 1 to 3 of the present invention, stored heat may be used for other uses than hot-water supply or panel heaters, and the heat usage terminal 31 is not limited to the bath or the floor heating appliance, that is, it may be a terminal that uses heat for another user. The other use may be usage of an appliance using radiation heat, such as a panel heater or a floor heating appliance, or may be, for example, usage of an appliance that blows out hot air, such as an air conditioner or a fan heater.

As illustrated in FIG. 7, in a heat pump apparatus 300, the heat-storage heat exchanger 12 of the heat pump apparatus 10 is provided in the heat storage tank 21, and the heat storage medium 29 containing a latent heat storage material is provided in the heat storage tank 21. Furthermore, in the heat storage tank 21, a heat exchanger 27 is provided. The heat exchanger 27 includes a flow passage through which a heat medium 29a circulating between the heat storage tank 21 and a panel heater 26 flows. The heat medium 29a may be different from the heat medium 19 flowing through the heat pump 10, and may be, for example, water or antifreeze.

The heat-storage heat exchanger 12 provided in the heat storage tank 21 may be a heat exchanger configured such that the heat storage medium 29 is provided outside a metal pipe in which a flow passage allowing the heat medium 19 to flow therethrough is provided. Similarly, the heat exchanger 27 provided in the heat storage tank 21 may be a heat exchanger configured such that the heat storage medium 29 is provided outside a metal pipe in which a flow passage allowing the heat medium 29a to flow therethrough is provided. Each of the heat-storage heat exchanger 12 and the heat exchanger 27 may be, for example, a coil heat exchanger formed by coiling the metal pipe.

The panel heater 26 achieves heating by transferring the heat of the heat medium 29a into a room via a radiation panel provided with a flow passage allowing the heat medium 29a to flow therethrough. A circulation pump 25 is provided between the panel heater 26 and the heat exchanger 27 provided in the heat storage tank 21. Since the rotation speed of the circulation pump 25 is controlled by a controller 241, the amount of circulation of the heat medium 29a that circulates between the heat exchanger 27 provided in the heat storage tank 21 and the panel heater 26 is controlled by the controller 241. When the rotation speed of the circulation pump 25 per unit time is increased, the amount of circulation of the heat medium 29a is increased, whereby it is possible to increase the amount of heat to be transferred into a room in which the panel heater 26 is installed. The panel heater 26 is connected by the pipes 24a and 24b to a pipe h2h connected to the circulation pump 25 and the pipe h2e connected to the heat exchanger 27. In the present embodiment, it is assumed that none of the panel heater 26 and the pipes 24a and 24b are included in the heat pump apparatus 300. The sixth temperature detector T6 is provided at the pipe h2e between the heat exchanger 27 provided in the heat storage tank 21 and the panel heater 26. The controller 241 may control the rotation speed of the circulation pump 25 based on a sixth temperature detected by the sixth temperature detector T6. Alternatively, the sixth temperature detector T6 may be provided at the pipe h2h. In the case where the sixth temperature detector T6 is provided at the pipe h2e, the rotation speed of the circulation pump 25 may be controlled based on the temperature of the heat medium 29a that is supplied to the panel heater 26. In the case where the sixth temperature detector T6 is provided at the pipe h2h, the rotation speed of the circulation pump 25 may be controlled based on the temperature of the heat medium 29a that is discharged from the panel heater 26.

The heat storage medium 29 housed in the heat storage tank 21 is a heat storage medium containing a latent heat storage material alone or a mixture of a latent heat storage material and a sensible heat storage material. The heat storage medium 29 may be formed of a single kind of latent heat storage material or a mixture of plural kinds of latent heat storage materials. It should be noted that the above latent heat storage medium means a heat storage material that stores heat by using latent heat which is entailed by a phase change from a solid state to a liquid state due to melting, and the above sensible heat storage material means a heat storage material that stores heat by utilizing a temperature change without a phase change. Since the latent heat of a heat storage material per unit volume is higher than sensible heat, the use of the latent heat storage medium makes it possible to store a larger amount of heat with a smaller capacity. Therefore, in the case of using a latent heat storage medium, it is possible to reduce the size of the heat storage tank 21. The fourth temperature detector T4 is provided inside the heat storage tank 21 and detects a fourth temperature that indicates the temperature of the heat storage medium 29.

The latent heat storage material may be a hydrate medium such as sodium acetate trihydrate or sodium thiosulfate pentahydrate or an organic medium such as paraffin. The melting point of sodium acetate trihydrate is, for example, 58 degrees C. The melting point of sodium thiosulfate pentahydrate is, for example, 48 degrees C. The melting point of paraffin is, for example, 56 degrees C. In order to extract an amount of heat having a higher temperature from the heat storage medium 29, it is preferable that the melting point of the latent heat storage medium be high, and sodium acetate trihydrate or paraffin is suitable as a latent heat storage medium for specific uses requiring higher temperatures, such as hot-water supply and panel heaters. Furthermore, the heat storage density of sodium acetate trihydrate is, for example, 0.54 MJ/L, and the heat storage density of paraffin is, for example, 0.28 MJ/L. Thus, sodium acetate trihydrate is preferable to paraffin, since the heat storage tank 21 can be made smaller if sodium acetate trihydrate is applied.

The sensible heat storage material is a liquid such as water or antifreeze, a solid or liquid whose melting point or boiling point is higher than the temperature of the heat medium 19 discharged from the compressor 11. The amount of heat that is stored by a sensible heat storage material per unit volume is smaller than the amount of heat that is stored by a latent heat storage material per unit volume. Therefore, in order to reduce the size of the heat storage tank 21, it is preferable that the heat storage medium 29 be formed of a latent heat storage material alone without containing a sensible heat storage material. In sodium acetate trihydrate, latent heat per 1 kg is, for example, 245 kJ, and sensible heat per 1 kg per temperature of 1 K is, for example, 2.617 kJ. In order that an amount of sensible heat that is equivalent to an amount of latent heat be stored, the temperature of sodium acetate trihydrate must be raised by approximately 93 K. It is hard to achieve such a high rise in temperature by heating with a heat pump, and in order that an amount of sensible heat that is equivalent to an amount of latent heat be stored, the volume of the heat storage material must be increased. Therefore, since a sensible heat storage material requires a larger volume than a latent heat storage material, it is possible to reduce the size of the heat storage tank 21 by using a latent heat storage medium.

Figure 8:
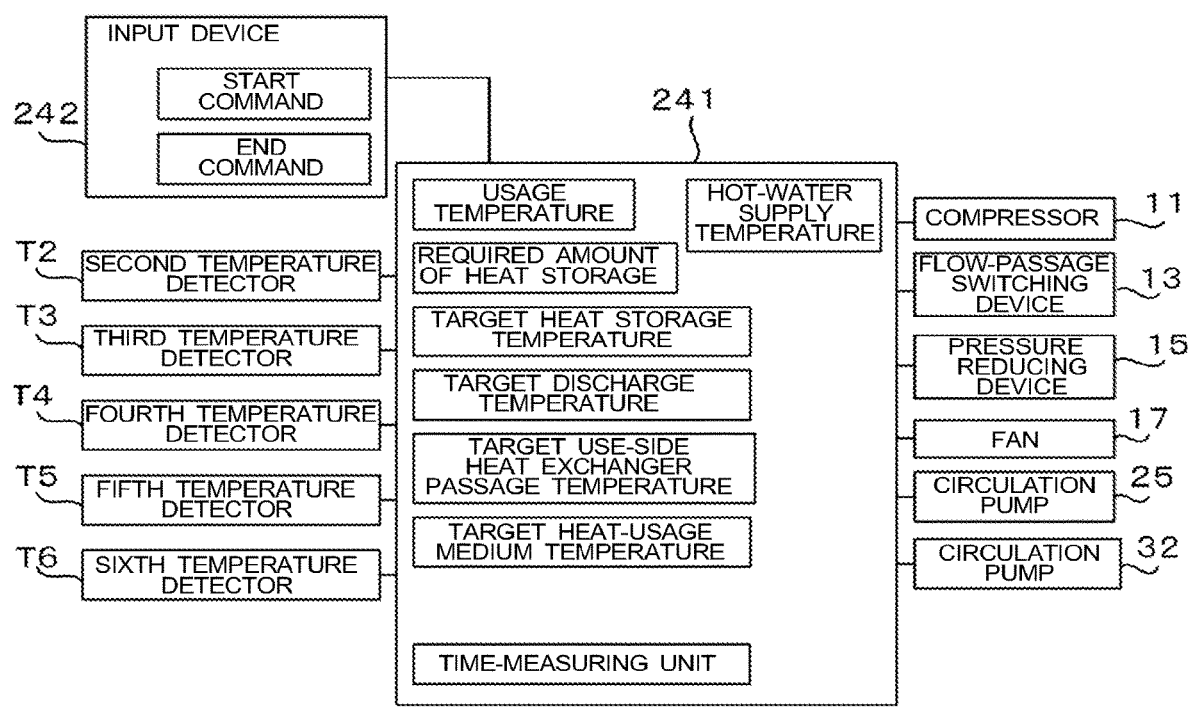
FIG. 8 is a block diagram of a configuration of a controller of the heat pump apparatus according to embodiment 3 of the present invention.

FIG. 8 is a block diagram of a configuration of a controller of the heat pump apparatus according to embodiment 3 of the present invention. In FIG. 8, components which are the same as or equivalent to those in FIGS. 2 and 5 are denoted by the same reference signs, and their descriptions will thus be omitted.

An input device 242 includes a start command button to give a command to start usage of the floor heating appliance corresponding to the heat usage terminal 31 and an end command button to give a command to end the usage of the floor heating appliance, as in the heat pump apparatus according to embodiment 2. Furthermore, the input device 242 may include a temperature setting unit that sets the floor heating temperature of the floor heating appliance. The start of usage of the floor heating appliance means the start of usage of the use-side heat exchanger 14, and the ending of usage of the floor heating appliance means the ending of usage of the use-side heat exchanger 14.

The controller 241 stores in a storage unit, a floor heating temperature, an indoor heating temperature and a required amount of heat storage. The floor heating temperature is a set temperature of the floor heating appliance, and is input from the input device 242. The indoor heating temperature is a set temperature of a room that is heated by the panel heater 26, and is input from an operation unit of the panel heater 26 or the like. The required amount of heat storage is a required amount of heat that is stored to be used in the panel heater 26, and is calculated by the controller 241 based on information on the dimensions of the room that is heated by the panel heater 26. Alternatively, the controller 241 changes the required amount of heat storage in accordance with the time determined by the time-measuring unit. For example, it may be set that in the case where the time determined by the time-measuring unit is during the nighttime, the required amount of heat storage is set large, and in the case where the time measured by the time-measuring unit is during the daytime, the required amount of heat storage is set small, whereby the energy consumption of day in the home or the region can be reduced. Heat stored in the nighttime in the case where the required amount of heat storage is set large can be applied to heating by the panel heater 26 in the daytime. Thereby, it is possible to reduce the amount of electric power that is used in the daytime, in which a large amount of electric power tends to be used. Furthermore, heat stored in the nighttime, in which electric power rates are relatively low, can be used in the daytime. It is therefore possible to reduce the amount of electric power used in the daytime, in which electric power rates are relative high, and thus reduce electric power rates.

Figure 9:
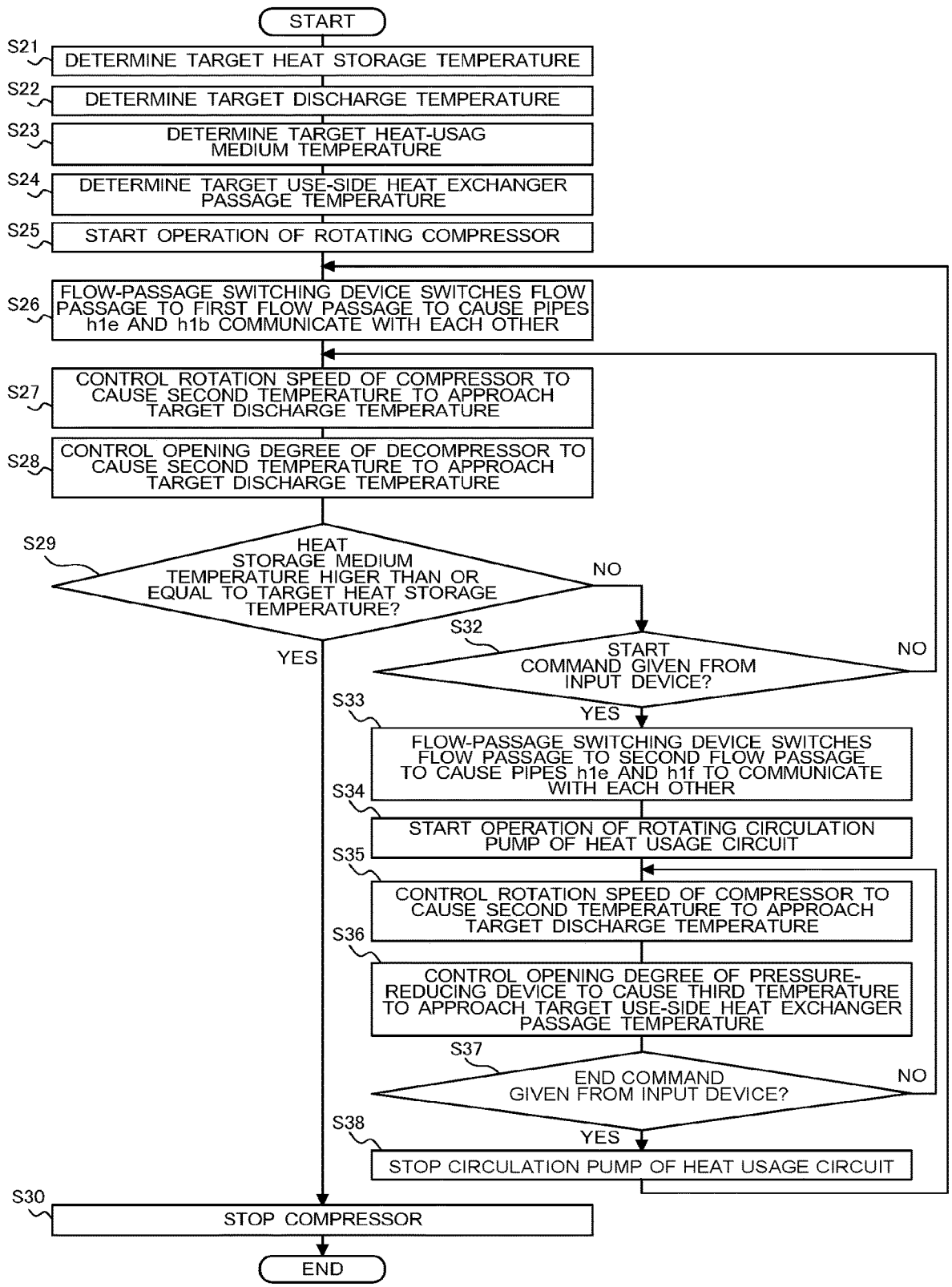
FIG. 9 is a flow chart of a control operation of the heat pump apparatus according to embodiment 3 of the present invention.

The operation of the heat pump apparatus 300 will be described. FIG. 9 is a flow chart of a control operation of the heat pump apparatus according to embodiment 3 of the present invention. The control operation as indicated in FIG. 9 is the same as that of FIG. 6 of embodiment 2, except that the control operation as indicated in FIG. 9 includes neither the step of determining the water level of the heat usage medium 39 nor the steps of starting and stopping the operation of rotating the circulation pump of the heat storage circuit. In the case where the heat usage terminal 31 is a floor heating appliance, the heat usage medium 39 is present at all times in a flow passage provided under the floor, through which the heat usage medium 39 flows, it is not necessary to determine the water level of the heat usage medium 39. The heat usage medium 39 of the floor heating appliance may be water or antifreeze. However, in the case where the heat usage terminal 31 is a bathtub of a bath, the step of determining a water level may be provided as described with respect to embodiment 2.

First, the controller 241 determines the target heat storage temperature. The target heat storage temperature is determined higher than the melting point of the latent heat storage material contained in the heat storage medium 29. That is, the target heat storage temperature is determined such that the latent heat storage medium is melted by heat having entered the latent heat storage medium 29 via the heat-storage heat exchanger. In the case where the heat storage medium 29 is formed of plural kinds of latent heat storage materials, it is preferable that the target heat storage temperature be determined higher than the highest one of the melting points of the latent heat storage materials. For example, the target heat storage temperature may be equal to the sum of the melting point of the latent heat storage material contained in the heat storage medium 29 and δ, and for example, δ may be equal to 10 degrees C. In the case where the target heat storage temperature is determined higher than the melting point of the latent heat storage material contained in the heat storage medium 29, the latent heat storage material contained in the heat storage medium 29 is melted when heat is stored in the heat storage medium 29, and the state of the latent heat storage material changes in phase from a solid state to a liquid state, whereby heat is stored using latent heat generated by the phase change. The amount of stored heat can be greatly increased, as compared with the case where the target heat storage temperature is lower than the melting point of the latent heat storage material. Furthermore, in the case where the heat storage medium 29 contains plural kinds of latent heat storage materials, when the target heat storage temperature is determined higher than the highest one of the melting points of the latent heat storage materials, it is possible to use latent heat in a phase change of the latent heat storage materials, in which the states of the latent heat storage materials change from a solid state to a liquid state.

Next, in step S22, the controller 241 determines the target discharge temperature; in step S23, it determines the target heat usage medium temperature; and in step S24, it determines the target use-side heat exchanger passage temperature. These target temperatures are determined in the manners described with respect to embodiment 1 or 2. Then, in step S25, the controller 241 rotates the compressor 11, and in step S26, it controls the flow-passage switching device 13 to switch the flow passage for the heat medium 19 to the first flow passage that does not extend through the use-side heat exchanger 14. Next, in step S27, the controller 241 controls the rotation speed of the compressor 11, and in step S23, it controls the opening degree of the pressure reducing device 15 such that the temperature of the heat medium 19 discharged from the compressor 11 approaches the target discharge temperature.

Next, in step S29, the controller 241 determines, based on the fourth temperature detected by the fourth temperature detector T4 provided in the heat storage tank 21, whether the temperature of the heat storage medium 29 is higher than or equal to the target heat storage temperature or not. When the controller 141 determines that the temperature of the heat storage medium 29 is higher than or equal to the target heat storage temperature, the control by the controller 141 proceeds to step S30 and the controller 141 stops the compressor 11. Thereby, an amount of heat which covers the required amount of heat storage is stored in the heat storage tank 21, as described regarding embodiments 1 and 2.

By contrast, in step S29, when the controller 241 determines that the temperature of the heat storage medium 29 is lower than the target heat storage temperature, the control by the controller 141 proceeds to step S32. In step S32, when the controller 241 determines that a start command is given from the input device 242, the control by the controller 242 proceeds to step S33. In step S33, the controller 141 controls the flow-passage switching device 13 to switch the flow passage for the heat medium 19 to the second flow passage that leads to the pressure reducing device 15 via the use-side heat exchanger 14.

Next, in steps S34 to S36, the controller 241 rotates the circulation pump 32 of the heat usage circuit 30, controls the rotation speed of the compressor 11 such that the second temperature detected by the second temperature detector T2 provided on the discharge side of the compressor 11 approaches the target discharge temperature, and controls the opening degree of the pressure reducing device 15 such that the third temperature detected by the third temperature detector T3 provided downstream of the use-side heat exchanger 14 of the heat pump circuit 10 approaches the target use-side heat exchanger passage temperature. Thereby, the heat usage medium 39 is circulated in the heat usage circuit 30, and heat exchange is performed between the heat medium 19 and the heat usage medium 39 in the use-side heat exchanger 14. Then, the heat usage medium 39 heated by heat exchange with the heat medium 19 flows through the flow passage provided under the floor and heats the floor, thereby performing floor heating.

In the heat pump apparatus 300 according to embodiment 3, the heat medium 19 discharged in a high temperature and high pressure state from the compressor 11 transfers heat in the heat-storage heat exchanger 12, and then further transfers heat in the use-side heat exchanger 14, as a result of which the amount of heat transferred by the heat medium 19 is larger than in the case where the heat medium 19 transfers heat only in the heat-storage heat exchanger 12, and a decrease in the efficiency of the heat pump is reduced, as in the heat pump apparatus 200 described in embodiment 1 and the heat pump apparatus 200 described in embodiment 2.

Next, in step S37, the controller 241 determines whether an end command is given from the input device 242 or not. When the controller 241 determines that an end command is given from the input device 242, the control by the controller 241 returns to step S35. By contrast, when the controller 241 determines that an end command is given from the input device 242, the control by the controller 241 proceeds to step S38.

In step S38, the controller 241 stops the circulation pump 32 of the heat usage circuit 30. Then, the control by the controller 141 returns to step S26, and the controller 141 controls the flow-passage switching device 13 to switch the flow passage for the heat medium 19 to the first flow passage that leads to the pressure reducing device 15 without extending through the use-side heat exchanger 14, and causes the heat storage operation to continue.

Then, in step S29, when the controller 241 determines that the temperature of the heat storage medium 29 is higher than or equal to the target heat storage temperature, in step S30, the controller 241 stops the compressor 11. Because of the above operations, in the heat storage tank 21, an amount of heat which covers the required amount of heat is stored.

Then, the heat stored in the heat stored medium 29 containing a latent heat storage material in the heat storage tank 21 is used in the panel heater 26 by rotation of the circulation pump 25, which is carried out by the controller 241. To be more specific, when the circulation pump 25 is rotated, the heat medium 29a flows in the heat exchanger 27 provided in the heat storage tank 21, and heat of the heat storage medium 29 is transferred to the heat medium 29a. The latent heat storage material contained in the heat storage medium 29 is coagulated in transfer of heat, and thus changes from a liquid state to a solid state as a phase change. The heat medium 29a is heated by latent heat generated in the phase change of the latent heat storage material from the liquid state to the solid state. The heated heat medium 29a transfers heat in the panel heater 26, thereby heating the room in which the panel heater 26 is installed.

It should be noted that the above description of embodiment 3 is made with respect to the case where the controller 241 controls the flow-passage switching device 13 in response to a start command or an end command which is given from the input device 242. However, as described regarding embodiment 1, the flow passage switching temperature at which the flow-passage switching device 13 switches the flow passage between plural flow passages may be set, and the controller 241 may control the flow-passage switching device 13 based on the comparison between the temperature of the heat medium 19 having passed through the heat-storage heat exchanger 12 and the flow passage switching temperature.

The above description of embodiment 3 is made with respect to the case where the heat usage terminal 31 is a floor heating appliance, and the heat usage medium 39 is water. However, the heat usage medium 39 may contain a latent heat storage material as well as the heat storage medium 29. In this case, the heat usage medium 39 is a fluid heat storage material that maintains fluidity and also stores heat using latent heat entailed by a phase change from a solid state to a liquid state due to melting.

In the case where a fluid heat storage material is used as the heat usage medium 39, it suffices to select a fluid heat storage material which has a melting point of approximately 30 to 35 degrees C., and which is generally applied to floor heating appliances. As described above, it is preferable that the melting point of the latent heat storage material 29 be approximately 56 to 58 degrees C. Therefore, the melting point of the fluid heat storage material is lower than that of the latent heat storage material 29. Thus, as in the heat pump apparatus 100 described regarding embodiment 1 and the heat pump apparatus 200 described regarding embodiment 2, the heat medium 19 discharged in a high temperature and high pressure state from the compressor 11 transfers heat in the heat-storage heat exchanger 12, and further transfers heat in the use-side heat exchanger 14. Therefore, the heat medium 19 transfers a larger amount of heat than in the case where it transfers heat only in the heat-storage heat exchanger 12. Thereby, it is possible to reduce a decrease in efficiency of the heat pump.

REFERENCE SIGNS LIST 10 heat pump circuit 11 compressor 12 heat-storage heat exchanger 13 flow-passage switching device 14 use-side heat exchanger 15 pressure reducing device 16 heat-reception-side heat exchanger 19 heat medium 20 heat storage circuit 21 heat storage tank 22 circulation pump 29 heat storage medium 30 heat usage circuit 31 heat usage terminal 32 circulation pump 39 heat usage medium 41 controller 42 input device 100, 200, 300 heat pump apparatus T1, T2, T3, T4, T5, T6 temperature detector

The invention claimed is:
1. A heat pump apparatus comprising:
a pressure reducing device configured to expand a heat medium flowing into the pressure reducing device to reduce a pressure of the heat medium, and then allow the heat medium to flow from the pressure reducing device;
a heat-reception-side heat exchanger into which the heat medium flowing from the pressure reducing device flows, the heat-reception-side heat exchanger being configured to cause heat exchange to be performed between the heat medium and a heat source;
a compressor configured to suck the heat medium flowing from the heat-reception-side heat exchanger, compress the heat medium to increase a pressure of the heat medium, and discharge the heat medium;
a heat-storage heat exchanger into which the heat medium discharged from the compressor flows, the heat-storage heat exchanger being configured to cause heat exchange to be performed between the heat medium and a heat storage medium, the heat storage medium is stored in a heat storage tank, wherein when the heat-storage heat exchanger performs heat exchange between the heat medium and the heat storage medium, heat is stored in the heat storage medium in the heat storage tank;

a use-side heat exchanger into which the heat medium flows from the heat-storage heat exchanger, the use-side heat exchanger being configured to cause heat exchange to be performed between the heat medium and a heat usage medium, and then allow the heat medium to flow from the use-side heat exchanger to the pressure reducing device;

a flow-passage switching device configured to switch a flow passage for the heat medium discharged from the heat-storage heat exchanger to a first flow passage or a second flow passage, the first flow passage extending through the pressure reducing device, the heat-reception-side heat exchanger, the compressor and the heat-storage heat exchanger without extending through the use-side heat exchanger, and the second flow passage extending through the pressure reducing device, the heat-reception-side heat exchanger, the compressor, the heat-storage heat exchanger and the use-side heat exchanger; and a first temperature detector configured to detect a first temperature which is a temperature of the heat medium after passing through the heat-storage heat exchanger, wherein the flow-passage switching device switches the flow passage from the first flow passage to the second flow passage, when the first temperature becomes higher than or equal to a usage temperature of the heat usage medium.

2. The heat pump apparatus of claim 1, wherein
the flow-passage switching device is provided between the heat-storage heat exchanger and the use-side heat exchanger, and
the first temperature detector is provided between the heat-storage heat exchanger and the flow-passage switching device.

3. The heat pump apparatus of claim 1, further comprising:
an input device to which a start command to start usage of the use-side heat exchanger is input, wherein
the flow-passage switching device switches the flow passage from the first flow passage to the second flow passage in response to the start command.

4. The heat pump apparatus of claim 1, further comprising:
a second temperature detector configured to detect a second temperature that is a temperature of the heat medium discharged from the compressor; and
a third temperature detector configured to detect a third temperature that is a temperature of the heat medium flowing from the use-side heat exchanger, wherein
when the flow-passage switching device switches the flow passage to the first flow passage, a rotation speed of the compressor or an opening degree of the pressure reducing device is controlled based on the second temperature, and
when the flow-passage switching device switches the flow passage to the second flow passage, the rotation speed of the compressor is controlled based on the second temperature, and the opening degree of the pressure reducing device is controlled based on the third temperature.

5. The heat pump apparatus of claim 1, wherein
the heat-storage heat exchanger includes a heat storage medium flow passage through which the heat storage medium flows,
the use-side heat exchanger includes a heat-use-medium flow passage through which the heat usage medium flows,
the heat pump apparatus further comprises a first circulation pump connected to the heat storage medium flow passage, and a second circulation pump connected to the heat-use-medium flow passage, and
when the flow-passage switching device switches the flow passage to the second flow passage, the first circulation pump and the second circulation pump are controlled such that a ratio between a flow rate of the heat storage medium and a flow rate of the heat usage medium varies.

6. The heat pump apparatus of claim 1, wherein
the heat-storage heat exchanger is provided in the heat storage tank which contains the heat storage medium, and
the heat storage medium contains a latent heat storage material that is melted by heat that enters the heat storage medium via the heat-storage heat exchanger.

7. The heat pump apparatus of claim 6, wherein the latent heat storage material contains sodium acetate trihydrate.

8. The heat pump apparatus of claim 6, wherein
the heat usage medium contains a latent heat storage material that is melted by heat that enters the heat usage medium via the use-side heat exchanger, and
the latent heat storage material contained in the heat usage medium has a melting point that is lower than a melting point of the latent heat storage material contained in the heat storage medium.

* * * * *